United States Patent

[11] 3,572,612

[72] Inventor Karl Irbitis
Montreal, Quebec, Canada
[21] Appl. No. 744,828
[22] Filed July 15, 1968
[45] Patented Mar. 30, 1971
[73] Assignee Canadair Limited
Montreal, Quebec, Canada
[32] Priority Aug. 2, 1967
[33] Canada
[31] 996911

[54] PROGRAMMING AND MIXING UNIT FOR VTOL AIRCRAFT
63 Claims, 18 Drawing Figs.

[52] U.S. Cl. .................................................. 244/7
[51] Int. Cl. .................................................. B64c 29/00
[50] Field of Search ................................... 244/7, 7.3, 12(A), 56

[56] References Cited
UNITED STATES PATENTS

| | | | |
|---|---|---|---|
| 2,936,967 | 5/1960 | Dancik | 244/7(.3) |
| 2,991,026 | 7/1961 | Nelson et al. | 244/12(A) |
| 3,107,881 | 10/1963 | Stuart | 244/7(.3) |
| 3,179,352 | 4/1965 | Nelson | 244/7(.3) |
| 3,197,157 | 7/1965 | King | 244/7(.3) |

OTHER REFERENCES

Aviation Week & Space Technology; McGraw-Hill; New York, N.Y.; Jan. 14, 1963; pp. 60— 69

*Primary Examiner*—George E. A. Halvosa
*Assistant Examiner*—Jeffrey L. Forman
*Attorney*—Cushman, Darby and Cushman ABSTRACT: A control system for a tilt wing VTOL aircraft is described. In normal or horizontal flight at a wing tilt angle of zero, the conventional attitude control elements have control authority i.e. the pilots pitch, yaw and roll controls are transmitted respectively to the usual elevators, rudder, and ailerons. As wing tilt angle increases, however, roll control authority is gradually transferred to laterally spaced thrust producers positioned on the aircraft wings, while yaw control authority is gradually transferred to the ailerons. At the same time, pitch control authority is gradually transferred by the control system to the only auxiliary attitude control element required, namely a vertical thrust producer located adjacent the tail end of the aircraft. The transfers of control authority are effected by a mixing and programming unit which includes a plurality of mechanisms the gain of which vary in response to the angle to the angle of wing tilt, such mixing and programming unit having inputs connected to receive the pilots pitch yaw and roll control signals, and outputs connected to the above mentioned attitude control elements.

Patented March 30, 1971
3,572,612
9 Sheets-Sheet 2
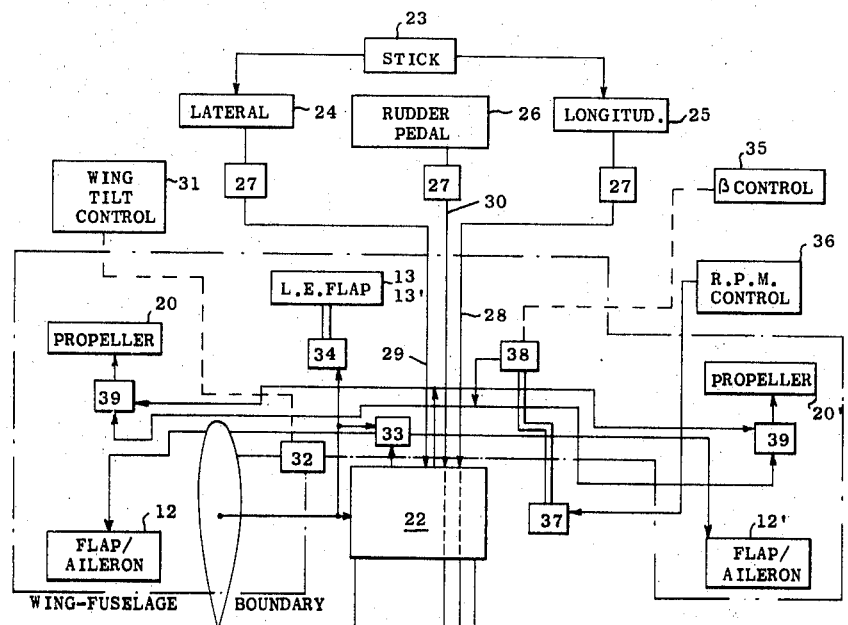
FIG.2
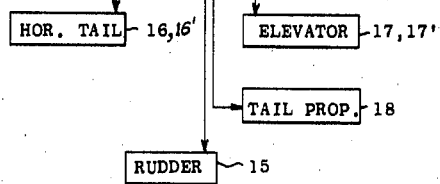
INVENTOR
KARL IRBITIS
BY
Cushman, Darby & Cushman
ATTORNEYS

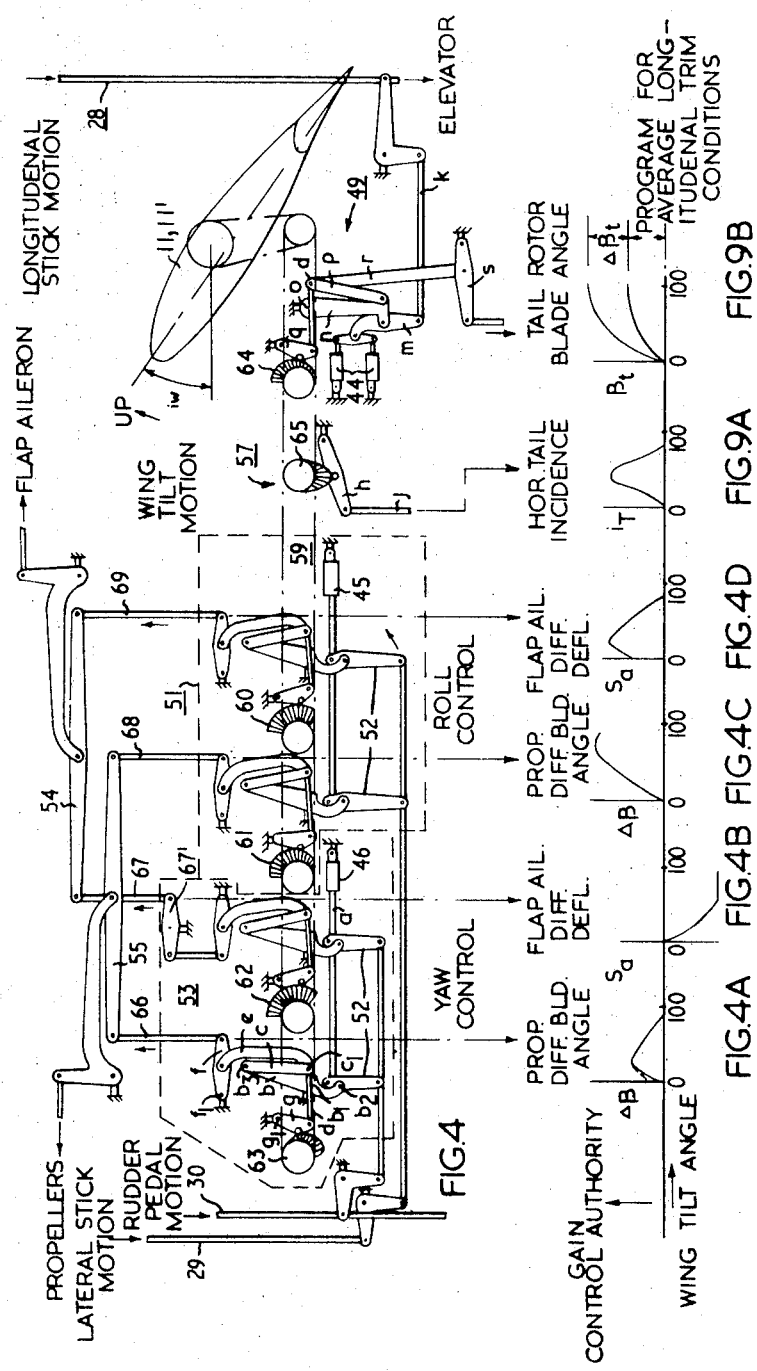

Patented March 30, 1971

INVENTOR
KARL IRBITIS
BY
Cushman Darby Cushman
ATTORNEYS

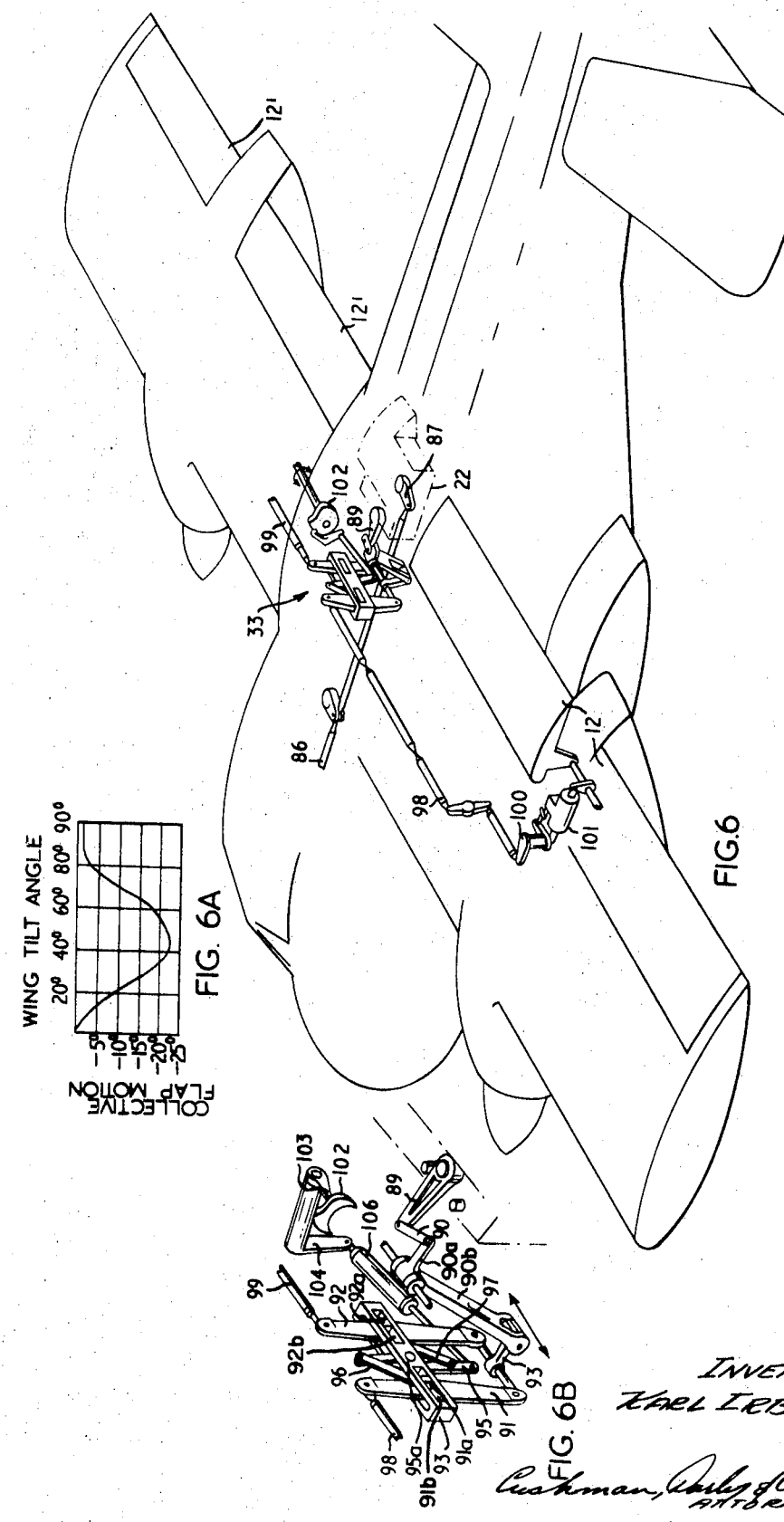

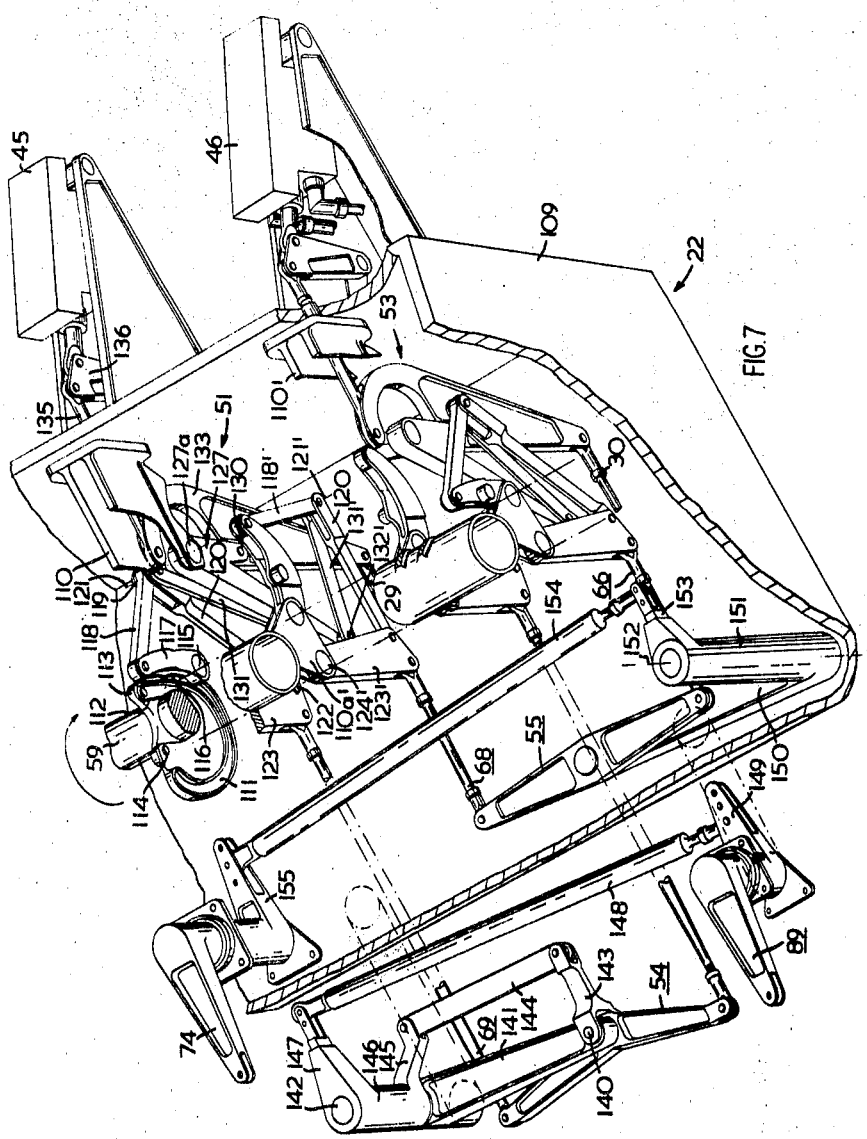

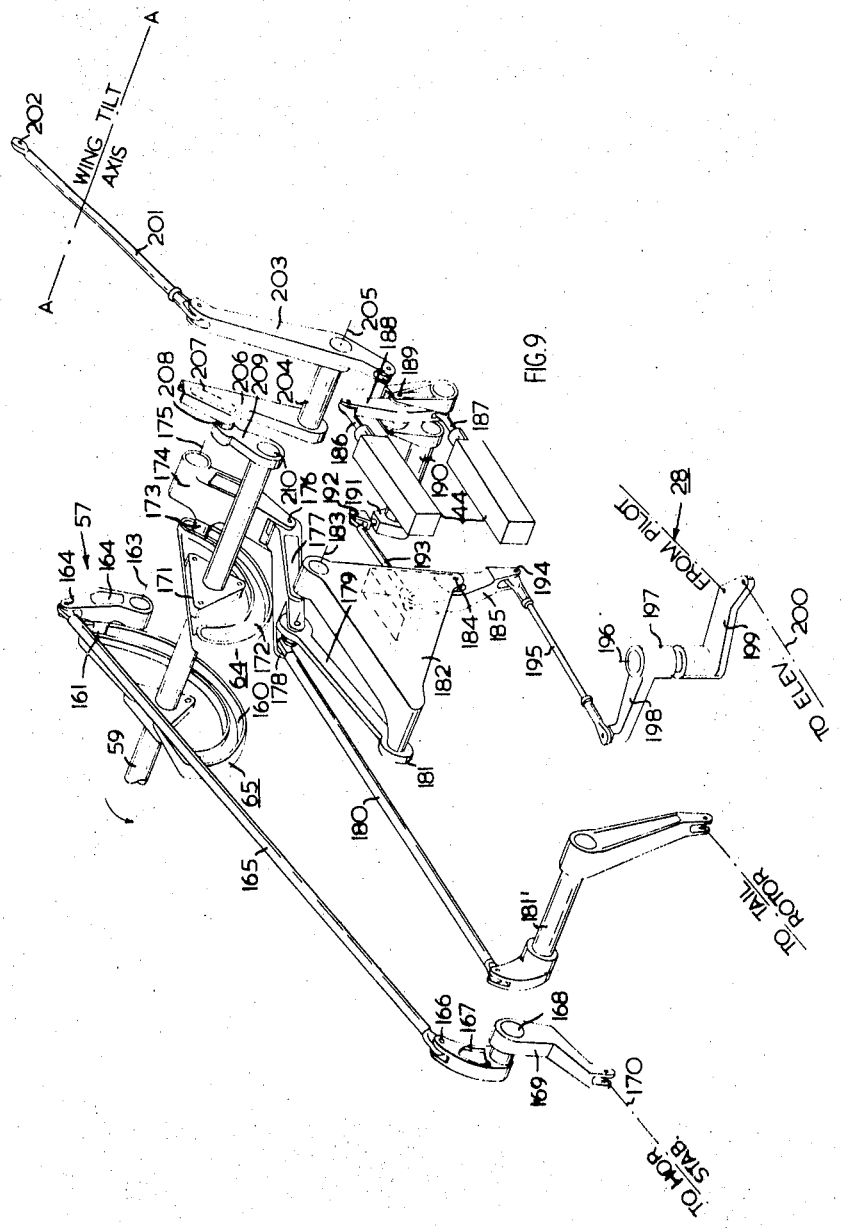

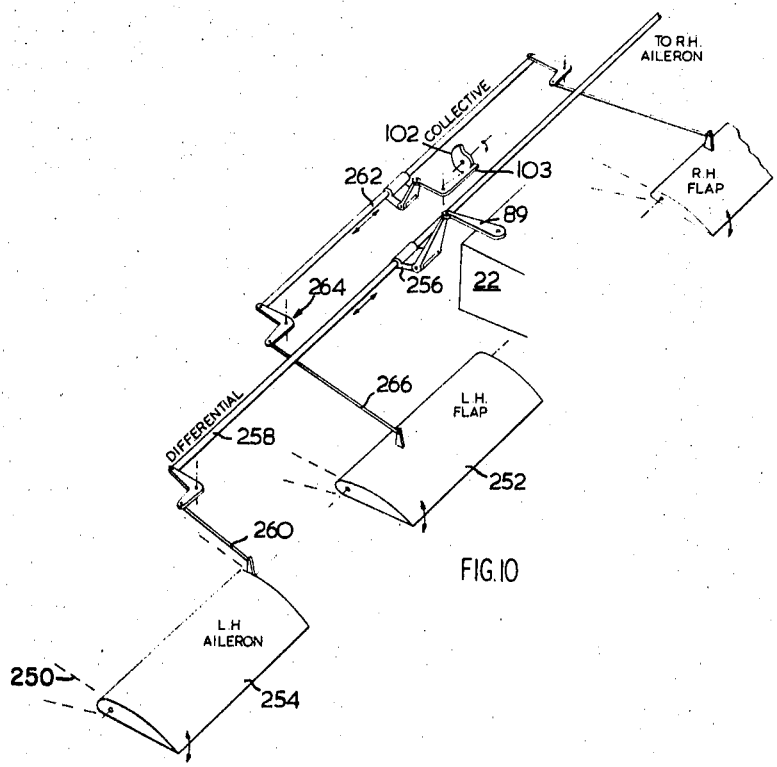

PROGRAMMING AND MIXING UNIT FOR VTOL AIRCRAFT

This invention relates to "VTOL" or convertible aircraft, and in particular to an improved control system for such aircraft which is effective in the horizontal, vertical and transitional flight modes as well as in hovering.

As is well known in the art, the flight reactions of the various attitude control elements of a VTOL aircraft in normal or horizontal flight differ vastly from those produced in vertical, or near vertical flight with the same control manipulations by the pilot. Certain attitude control elements, effective in normal flight, such as the rudder and the elevators, become ineffective in vertical flight. Other attitude control elements produce flight reactions in vertical flight different from the flight reactions in normal flight. Hence it is obvious that, since virtually all the conventional aircraft attitude control elements produce a different flight reaction as the aircraft goes from normal to vertical flight, control of such elements in all flight modes is beyond the skill of the average pilot.

The prior art has provided aircraft control systems for VTOL aircraft, which, as the aircraft goes from one flight mode to another, operates to transfer attitude control authority from one or more attitude control elements, to others of said control elements, thereby to simplify the pilot's task and enable him to control the aircraft in both horizontal and vertical flight. However, the majority of the prior art control systems provide only an incomplete transfer of control authority, i.e. aircraft control may be had around two of three axes of movement (pitch, roll or yaw) thus leaving the pilot to cope with the movement around the remaining axis and, as a result, complicating his task. Other prior art devices, while apparently providing control of the aircraft around all three axes utilizing the same pilot's control elements in all flight modes, require a number of auxiliary attitude control elements, and a control system of increased complexity therefor with attendant greater initial cost and greater maintenance cost.

It is a general object of the invention to provide an improved control system for a VTOL aircraft which permits complete control of the aircraft in all flight modes, using the conventional set of attitude control elements for pitch, roll, and yaw control, while at the same time being adapted for use when the number of auxiliary attitude control elements is kept to a minimum.

It is a further object of the invention to provide, in a VTOL aircraft, a compact and centralized control unit capable of transferring the pilot's normal stick and rudder movements to the proper aircraft attitude controls during all flight modes, said centralized control unit having a minimum number of parts and being arranged for ready accessibility and hence ready maintenance.

An aircraft embodying the features of the preferred embodiment of the present invention includes a pair of wings extending laterally of the fuselage, said wings each having a thrust producing means associated therewith. The aircraft includes pivotal mountings about which the wings and thrust producing means or engines may be tilted to vary the direction of lift and thrust. The wings will be provided with suitable control surfaces so disposed in relation to the thrust producing means that they are continuously in the high velocity gas stream produced by the latter, whereby they continue to function as airfoil control members in all positions of the wing. In normal or horizontal flight these control surfaces are an instrumentality for controlling aircraft roll. As the angle of wing tilt increases the ailerons gradually become instrumentalities for controlling yaw. Also, as the wing tilt angle increases as during the transition from horizontal to vertical flight, roll control is gradually transferred to the thrust producing means; roll control by the latter is had by introducing a differential in the thrust produced by said thrust producing means in response to the pilot's roll command signal. Accordingly, the preferred embodiment of the present invention provides yaw and roll programming assemblies designed to distribute the pilot's roll and yaw command signals between the mechanisms for producing thrust differential and the mechanisms for changing the aileron settings in varying ratios depending upon the angle of wing tilt. Aircraft embodying the features of the invention also include the usual rudder and elevator means; these may be connected directly to the pilot's control mechanism for controlling yaw and pitch respectively. However, since these two attitude control elements become ineffective in vertical flight or hovering, a vertically directed auxiliary thrust producing means is provided adjacent the rear portion of the aircraft. In the embodiment to be hereafter described, a variable pitch tail propeller is provided. A pitch programming assembly is interconnected between the pilot's pitch control mechanism and the pitch changing mechanism of such tail propeller, the pitch programming assembly being designed such that as wing tilt increases, control authority is gradually transferred to the tail propeller, thereby to perform the function of the elevators as the latter become ineffective during vertical flight.

Other objects, advantages, and aspects of the invention will become apparent from the description following and read in conjunction with the following drawings wherein:

FIG. 2 is a schematic diagram illustrating the control system and the attitude control elements controlled thereby;

FIG. 4 is a semischematic drawing illustrating the principle of operation of the programming and mixing unit;

Figure 8:
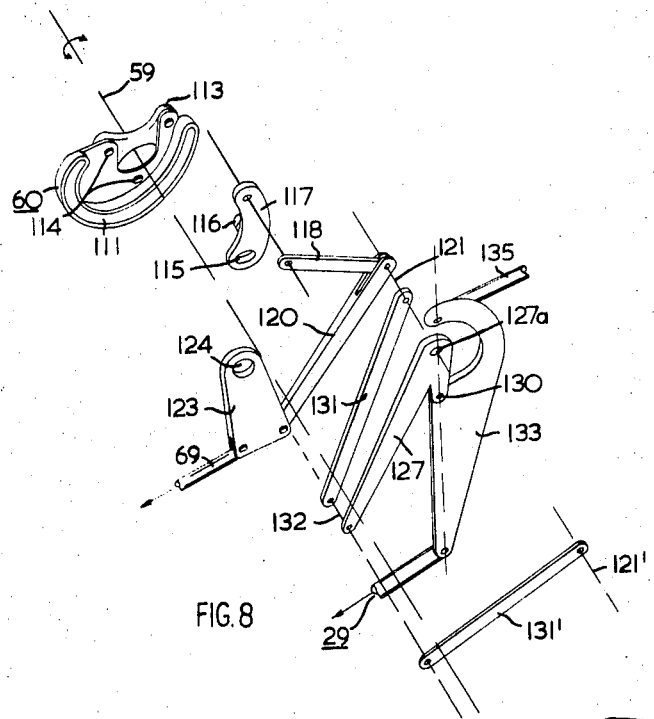
Figure 5:
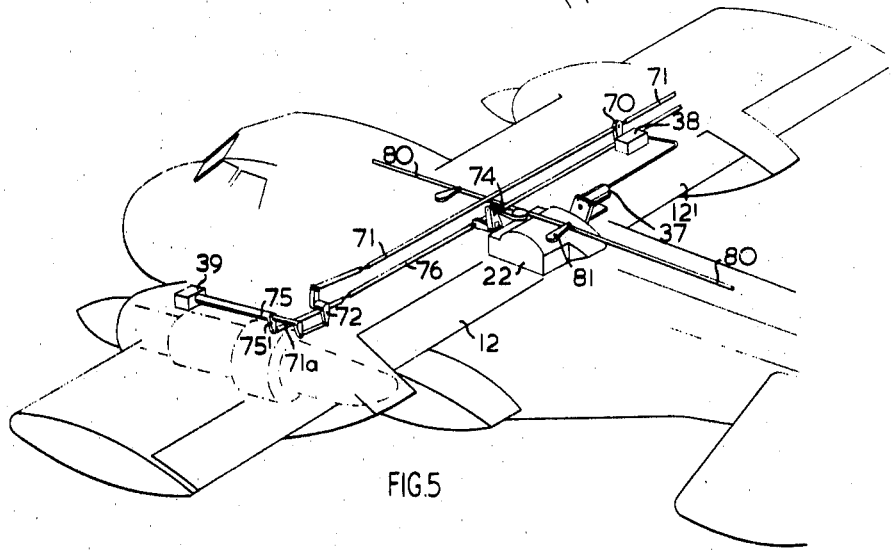

FIGS. 4A—4D are graphical representations illustrating the control authority of the thrust producing means and the ailerons at various angles of wing tilt;

FIG. 5 illustrates a portion of the mechanism for controlling the thrust of the thrust producing means;

FIG. 6 illustrates a portion of the mechanism for controlling the ailerons;

FIG. 6A illustrates graphically the collective flap-aileron motion as a function of wing tilt angle;

FIG. 6B is a perspective view of the mechanism for summing the collective and differential deflections of the ailerons so as to produce a net aileron setting output;

FIG. 7 is a perspective view of a portion of the central programming and mixing unit showing the construction of the roll and yaw programming assemblies;

FIG. 8 is a semischematic drawing illustrating further the principle of operation of one of the gain changing mechanisms of the assembly shown in FIG. 7;

FIG. 9 is a perspective view of a further portion of the central programming and mixing unit illustrating the mechanism for controlling the pitch of the aircraft tail propeller and the mechanism for controlling the angle of the aircraft horizontal stabilizers;

FIG. 9A illustrates graphically the tilt angle of the horizontal stabilizers as a function of wing tilt angle;

FIG. 9B illustrates graphically how the tail propeller blade angle is programmed as a function of wing tilt angle;

FIG. 10 illustrates a modified version of aircraft incorporating the invention and having independent flaps and ailerons.

Figure 1:
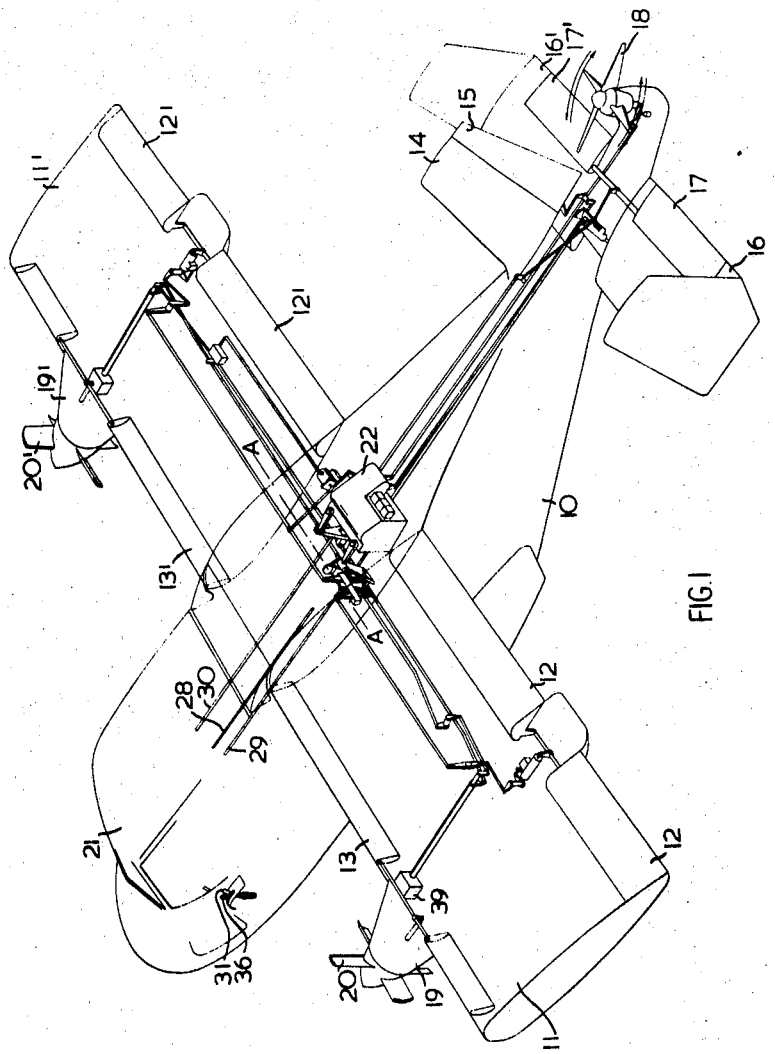
FIG. 1 is a pictorial representation of a VTOL aircraft including a control system according to the invention.

Referring first to FIG. 1, there is seen an aircraft having a fuselage generally indicated at 10. The aircraft includes airfoil surfaces (wings) 11, 11' extending laterally of the longitudinal axis of the fuselage thereby to provide a lifting force on the aircraft approximately at the center of gravity of the latter. Pivotally mounted adjacent the trailing edge portion of each of the wings 11, 11' are flap-ailerons 12 and 12', respectively. The flap-ailerons 12 and 12' are referred to as such since they each perform the dual function of a flap and an aileron, but it should be realized that the invention is also applicable to aircraft having independent flaps and ailerons. A fuller discussion of this may be found later in this disclosure. Pivotally attached to the leading edge portion of each of the wings 11, 11' are leading edge Kruger flaps 13, 13' respectively. Actuating means for the Kruger flaps 13, 13' and the flap-ailerons 12, 12' are provided and reference will be had thereto hereinafter.

The rearward portion of the fuselage is equipped with a vertical fin 14 having pivotally attached thereto a rudder 15 which performs in conventional fashion in horizontal flight. Also mounted adjacent the rearward portion of the fuselage and projecting laterally outwardly therefrom are horizontal stabilizers 16 and 16', each of the latter having pivotally mounted adjacent the trailing edges thereof, elevators 17, 17' respectively. Adjacent the extreme rearward end of the fuselage and rearwardly of the fin 14 there is mounted for rotation about a vertical axis, a tail propeller 18 having a plurality of variable pitch blades. The tail propeller 18 is driven in rotation by suitable drive shaft means connected to one or both of the driving means for the main propellers 20, 20'. The controls for the tail propeller, elevators, horizontal stabilizers and rudder will all be described in full detail hereinafter.

Attached in conventional fashion to wings 11, 11' are engine pods 19, 19'. The engine pods 19, 19' have mounted thereon the variable pitch main propellers 20, 20' respectively the latter being positioned to direct streams of high velocity gas over the flap-ailerons 12, 12' whereby the latter are enabled to provide roll and/or yaw control in the manner hereinafter described.

The wings 11, 11' are connected together and are mounted for rotation with respect to the body of the fuselage such that the wings together with the pods 19, 19' and their associated variable pitch propellers may be rotated from a substantially horizontal position to a substantially vertical position. The means for effecting such rotation of the airfoil surfaces with respect to the fuselage may comprise any well-known hydraulic actuator means, with the rotation effected thereby taking place about an axis A-A. Located in the forward portion of the fuselage 10 is the cockpit 21 which houses the pilot together with the usual control means for effecting yaw, pitch and roll control of the aircraft in normal, transitional, and vertical or hovering flight.

When the aircraft shown in FIG. 1 is in normal flight, yaw attitude control is preferably effected by changing the setting of the rear rudder only but an alternative is to provide yaw control in normal flight by rear rudder setting in combination with a small amount of differential between the settings of the blade pitch of the main propellers 20 and 20'. Roll attitude control in normal flight is effected by varying the angular position of flap-ailerons 12, 12' in the manner well known in the prior art, while pitch control of the aircraft is effected by varying the angular position of the elevators 17, 17'.

Obviously, when the wings 11, 11' have been rotated, to a vertical position for vertical or hovering flight, each of yaw, roll or pitch attitude control of the aircraft will be had by a different attitude control element than for normal flight. In the aircraft of the present invention, when the latter is in a vertical or hovering flight, yaw attitude control is maintained by means of the flap-ailerons 12, 12' while movement of the aircraft in roll is controlled by varying the setting of the blade angles of the main propellers 20, 20'. Pitch control of the aircraft in hovering or vertical flight is had by varying the blade pitch of the tail propeller 18. In transitional flight, as for example when the aircraft is going from normal, horizontal flight to vertical or hovering flight, yaw control is gradually transferred from the rear rudder alone or in combination with the main propellers to the flap-ailerons; roll control authority is gradually transferred from the flap-ailerons to the main propellers, and pitch control authority is gradually transferred from the rear elevators to the tail propeller. As mentioned previously the present invention provides improved means whereby such transfer of aircraft attitude control is accomplished smoothly and in such a manner that stick or rudder movement by the pilot results in substantially the same change in aircraft pitch, roll or yaw whether the aircraft is in vertical, hovering, horizontal or transitional flight.

In order to achieve a transfer of control authority from one attitude control element to another as the aircraft goes from normal to vertical or hovering flight, it is evident that the control movements received from the pilot must be programmed and mixed in a predetermined manner in order to achieve transfer of control authority in the manner indicated above. The central programming and mixing control unit which is an important feature of the present invention is designated as 22 in FIG. 1. The manner in which the central programming unit 22 receives control signals from the pilot, mixes and programmes such signals, and transmits same to the appropriate aircraft control surfaces will be more readily understood by referring to the schematic diagram shown in FIG. 2 taken in conjunction with FIG. 1. The central programming and mixing control unit 22 receives commands from the pilot through the stick 23 in conventional fashion and the lateral and longitudinal movements thereof are represented as 24 and 25 respectively; the pilot also effects control of the aircraft through a conventional rudder pedal 26. The mechanism for transmitting the pilot's command signals to the central mixing and programming unit 22 includes conventional boost, feel and trim mechanisms and these are designated as 27. The lines 28, 29 and 30 represent any suitable and conventional means to transmit the stick and rudder pedal movements to the unit 22. FIG. 1 illustrates the use of push rods to transmit the pilot's movements to the unit 22, but those skilled in the art will realize that cable and pulley arrangements may also be used in a manner well known in the prior art. A wing tilt control 31 is manually actuated by the pilot thereby to rotate the wings 11, 11' with respect to the fuselage of the aircraft; the wing tilt control 31 actuates a wing tilt mechanism 32 thereby to tilt the wings 11, 11' schematically shown in cross section in FIG. 2. As the wings 11, 11' are tilted, a mechanism 33 is actuated thereby to deflect the flap-ailerons 12, 12' in a programmed sequence related to the angle of wing tilt. This program sequence is clearly shown in FIG. 6A and reference will be had thereto more fully hereinafter. Tilting of the wings 11, 11' also serves to operate a further mechanism 34, the latter serving to deflect the leading edge Kruger flaps 13, 13' in a programmed sequence.

The mechanism 33 referred to above is actually a summing mechanism. This summing mechanism receives control inputs indicative of both a collective flap-aileron deflection together with a control signal indicative of a differential flap-aileron deflection from the mixing and programming unit 22 and produces as an output a net deflection for the right and left flap-ailerons 12 and 12'.

The pitch angle B of the main propellers 20, 20' is manually selected by the pilot by means of the pitch angle control 35. An r.p.m. setting control 36 is provided thereby to set the constant speed governor 37 (commonly abbreviated CSU) for a desired operating speed. The setting of the CSU monitors a control mechanism 38 for the propeller blade pitch angle which produces a collective output which is summed with a differential blade angle output produced by the programming and mixing unit 22 in summing mechanisms 39 thereby to produce a net propeller blade angle output for propellers 20 and 20'.

The rudder 15 and the elevators 17, 17' are connected to the programming and mixing unit 22 in such a manner that they are always deflected upon actuation of the rudder pedal 26, or longitudinal movement of stick 23 respectively in all flight modes, i.e. horizontal, vertical or transitional flight. It will be realized by those skilled in the art that the rudder 15 and the elevators 17, 17' will be completely ineffective in hovering or vertical flight and only partially effective in transitional flight. These direct types of connections between the rudder pedal and the rudder, and between the longitudinal stick motion and the elevators are represented as dotted lines passing through the programming and mixing unit 22 as shown in FIG. 2.

It will also be noted that the horizontal stabilizer 16, 16' receives an output control signal from the programming and mixing unit 22 such that the horizontal stabilizers are deflected in a programmed sequence in relation to the angle of tilt of the wings 11, 11'. The tail propeller 18 also receives blade pitch control signals from the central programming unit 22 thereby to replace or supplement the absence of, or alternatively the reduced pitch authority of, the elevator in vertical and transitional flight modes respectively.

Figure 3:
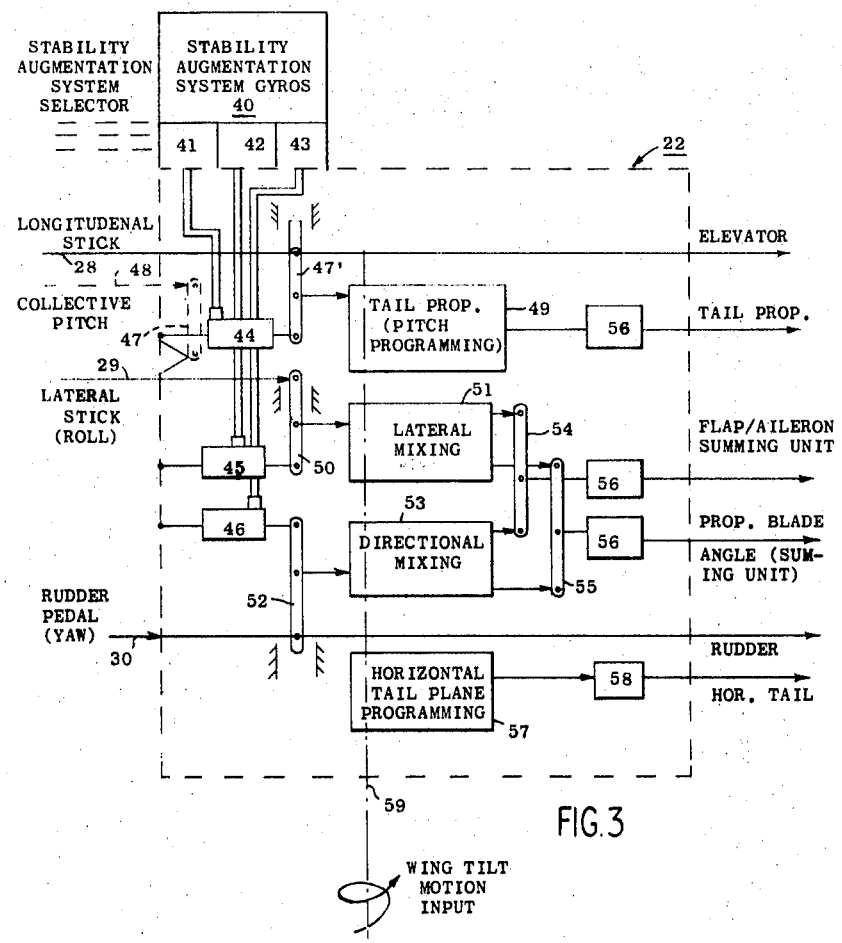
FIG. 3 is a schematic diagram of the central mixing and programming unit.

FIG. 3 is a schematic representation of the programming and mixing unit 22 and will be used to explain the operation of the latter. The actual configuration of the various parts of the mixing unit 22 is shown in subsequent FIGS., particularly FIGS. 7, 8 and 9. Upon actuation of the stick and rudder pedal by the pilot, a pitch command input 28, a roll command input 29 and a yaw command input 30 are transmitted to unit 22 by means of conventional mechanisms referred to previously. A stability augmentation system is also provided to assist in stabilizing the aircraft in pitch, yaw and roll. The block 40 represents the stability sensors and these may comprise any well-known and conventional means as for example, gyros. Instability of the aircraft causes an input 41, 42 or 43, as the case may be, to be transmitted to corresponding actuators 44, 45 or 46 respectively for either pitch, roll or yaw stability adjustment.

The longitudinal stick movement by the pilot, as indicated previously, is directly and always transmitted to the elevators 17, 17' as shown by the solid heavy line 28 going through the unit 22. The input 28 is also transmitted to an input summing lever 47' which also receives an input from the pitch stability augmentation actuator 44. A suitable modification is to combine a third input 48 with the other two inputs via summing lever 47; input 48 is used to induce in the programming of the tail propeller 18 an input related to the amount of collective pitch change of the main propellers 20, 20' occurring in hovering flight. This latter modification is not actually required in the present system since the assembly 49 about to be described is programmed to change the pitch of propeller 18 by the required amount at all times. The net pitch input provided by the input summing lever 47' is fed to a variable gain programming assembly 49 which is responsible for transferring pitch control authority to the tail propeller 18 as a function of the angle of tilt of the wings 11, 11' as will be explained in detail hereafter.

Lateral movement of the stick 23 represents the pilot's roll command as is conventional and well known in the art. Such roll command, as roll input 29, is transmitted to an input summing lever 50 and is added to the roll stability input adjustment received from the actuator 45. The net roll input provided by means of the input summing lever 50 is thereafter fed to a second variable gain programming assembly 51.

Movement of the rudder pedals 26 causes the pilot's yaw command input 30 to be combined with the yaw stability augmentation input received through actuator 46 by means of a further input summing lever 52 to produce a net yaw input which is fed to a third variable gain programming assembly 53. Line 30, as with line 28, is shown heavier to indicate that actuation of the rudder pedal will always operate the rudder 15 even when the latter is completely or partially ineffective for control purposes in the hovering and transitional flight modes.

The output of the tail propeller programming unit 49 is fed to the tail propeller blade pitch change mechanism via a load limiting spring arrangement 56 positioned in the force circuit so as to prevent damage to the system in the event of an overload. It will be noted that each of the variable gain programming assemblies 51 and 53 have two outputs. The first output of each of the assemblies 51 and 53 is summed by means of a summing linkage indicated at 54 thereby to produce a flap-aileron differential output. This differential output is also fed through a load limiting arrangement 54 to prevent damage to the system in case of overload and the differential output is thence fed into the summing unit 33 to be there combined with a collective flap-aileron input to produce a net flap-aileron output as described previously in connection with the schematic diagram of FIG. 2. The second output of each of the variable gain programming assemblies 51 and 53 is summed by means of a linkage indicated at 55 to produce a differential propeller blade angle output. This latter output is summed with a collective propeller blade angle input in each of the summing units 39 as described previously in connection with FIG. 2 thereby to produce a net propeller blade angle output for controlling the main propellers 20, 20'. The differential propeller blade angle output system is also provided with a load limiting arrangement 56.

A further assembly is shown in FIG. 3 and designated as 57 is programmed to provide controlled deflection of the horizontal stabilizers 16, 16' such that the latter are rotated as a unit in a programmed sequence as the wings 11, 11' are rotated. The output of the horizontal stabilizer programming assembly 57 is fed via a load limiting device 58 to the stabilizer actuator.

It is particularly important to note that all of the assemblies 49, 51, 53 and 57 receive a common input indicated by the dotted line 59 which is indicative of the motion of the wings 11, 11' as they are tilted from their normal position in horizontal flight to a position for vertical or hovering flight. Hence, the output of each of these units is a function of the angle of wing tilt as well as a function of the other inputs thereto as described above.

FIG. 4 is a still further schematic drawing indicating the principle of operation of the mixing and programming unit 22. The variable gain tail propeller blade angle control 49, and the variable gain assemblies 51 and 53 providing flap-aileron and propeller blade angle differential outputs respectively, together with the horizontal stabilizer programming unit 57 are all shown in sufficient detail as to enable those skilled in the art to understand the basic mechanisms involved. The actual mechanisms used do not necessarily correspond to those shown in this drawing; hence lower case letters rather than numerals will be used to designate the various elements of the variable gain mechanism as represented in FIG. 4.

The aircraft wings 11, 11' are schematically illustrated to the right of FIG. 4 in an angular position representing the transitional flight mode i.e. the wings 11, 11' are tilted upwardly from the normal or horizontal flight position by an angle shown as $i_w$. In normal flight the angle $i_w$ is zero whereas in vertical flight the angle $i_w$ is approximately 90°. The wing tilt motion is transmitted by any suitable mechanism to the aforementioned assemblies 49, 51, 53 and 57, thereby to control or vary the output of the latter as a function of the angle $i_w$, by rotating gain changing cams 64, 60, 61, 62, 63 and horizontal stabilizer control cam 65 by an angle equal to or directly proportional to the angle $i_w$.

The variable gain assembly 53 programs the yaw controlling output. This assembly, as was noted previously, receives as input, rudder pedal motion 30, the latter being transmitted by suitable push rod means to a pair of levers 52, the latter being pivoted to rod $a$. The axial position of rod $a$ is determined by the stability augmentation system actuator 46. Since the variable gain assembly 53 contains two very similar subsystems, reference only to the one controlled by gain changing cam 63 will be had. Lever $b$ is pivoted intermediate its ends at fixed pivot $b_1$ and is connected at one end to link 52 at pivot point $b_2$ and at its opposite end to one end of a further link $c$ at pivot point $b_3$. The opposite end of link $c$ is connected both to the end of a rod $d$ and to the end of a link $e$ at pivot point $c_1$. The opposite end of link $e$ is connected to an intermediate portion of lever $f$, the latter pivoted about the fixed point $f_1$ adjacent one end, with its opposite end pivotally attached to push rod 66. The end of rod $d$ opposite to the end connected to links $c$ and $e$ is pivoted to one end of a cam follower $g$, the latter being attached to fixed pivot point $g_1$. The cam 63 is so profiled that when the wing tilt angle $i_w$ is 90° approximately, input movement of link $b$ arising from rudder pedal motion and/or a stabilizing input from actuator 46 fails to cause any output via push rod 66. That is, the gain or control authority of the mechanism is zero at a 90° angle of wing tilt. This condition is achieved when cam follower $g$ has been swung as far as possible to the extreme left such that the fixed pivot $b_1$ and the pivot $c_1$ are in alignment. When this condition occurs, lever $b$ and link $c$ simply pivot together about the same axis and no movement is transmitted through link $c$. When the wing is tilted upwardly, the gain of the mechanism increases rapidly at first, reaches a maximum, and then decreases to zero at approximately 90° of wing tilt all as clearly shown in the graph of FIG. 4A. Hence, it can be seen that rudder pedal motion always effects at least some change in the propeller differential blade angle except when $i_w$ is either 0° or about 90° i.e. a contribution to yaw control is provided by a differential in blade pitch angle only in the transitional flight mode. Other cam profiles are of course possible; as mentioned previously, one suitable alternative provides a small amount of control authority in yaw by differential blade angle when $i_w$ is zero; this alternative is shown by the dotted line in the graph of FIG. 4A.

The variable gain mechanism controlled by cam 62 is responsible for programming the flap-aileron differential deflection output as a function of rudder pedal motion and wing tilt angle $i_w$. This mechanism is essentially the same as the one described above with the exception that it has an output contribution which is reversed with respect to the one previously described (i.e. when $i_w$ is greater than zero, flap-aileron differential deflection output induced by rudder pedal motion is in a direction opposite to any flap-aileron differential deflection induced by lateral stick position). This reversal is provided by the output motion reversing lever 67'. As seen from FIG. 4B, (the latter having been placed under the line to show that the contribution represented thereby is applied in a sense opposite to the other contributions), increase in $i_w$ causes an increase in the control authority of the rudder pedals over the flap-aileron differential deflection, with the gain reaching a constant value at an $i_w$ of roughly 45°; further increase in $i_w$ leaves the gain unchanged. Hence, in any flight mode other than normal flight, there is a contribution to yaw control by means of differential flap-aileron deflection, pilot control of the latter being had by means of rudder pedal motion.

As was noted previously, lateral stick motion is fed, together with a stabilizing input from actuator 45, into variable gain assembly 51, the latter providing as output a contribution to the roll control of the aircraft. Assembly 51, as with assembly 53, includes two variable gain mechanisms respectively controlled by programming cams 60 and 61. The mechanism controlled by cam 61 provides a contribution to roll control by varying the control authority of lateral stick motion on propeller differential blade angle. As may be seen from FIG. 4C, lateral stick motion has no effect on propeller differential blade angle at a wing tilt angle of 0°. However, there is a rapid increase in the roll control authority of differential blade pitch angle as the wing tilt angle increases, with the maximum control authority present just short of a 90° wing tilt angle.

The mechanism controlled by cam 60 permits lateral stick motion to effect roll control by means of flap-aileron deflection at a zero wing tilt angle. The authority of this mechanism increases for a time with increasing wing tilt angle, reaches a maximum, and then uniformly decreases to zero at a wing tilt angle of roughly 90°, all as clearly shown in the graph of FIG. 4D.

The outputs of the variable gain mechanisms controlled by the gain controlling cams 61 and 63 are fed via respective push rods 68, 66 to summing lever 55, the latter having been shown in connection with the schematic diagram of FIG. 3. The sum of these two outputs, representing the yaw and roll contribution of the propellers 20, 20' by way of differential blade pitch variation, is then fed to a summing mechanism there to be combined with a collective propeller blade angle control contribution, hence producing a net propeller blade pitch change output. In like manner, the outputs of the mechanisms controlled by cams 60 and 62 are fed via push rods 69, 67 respectively to opposing ends of summing lever 54 to produce a combined differential output representing the yaw and roll control contribution of the flap-ailerons 12, 12'.

The angle of attack of the horizontal stabilizer 16, 16' is controlled by means of programming cam 65, the latter serving to actuate pivoted cam follower $h$. Cam follower $h$ is connected to a suitable motion transmitting mechanism $j$, the latter in turn being connected to the horizontal stabilizer actuators (not shown). A typical plot representing horizontal tail incidence as a function of wing tilt angle $i_w$ will be shown hereinafter with reference to FIG. 9A.

The variable gain assembly 49 for the tail propeller 18 operates on exactly the same principle as the variable gain mechanisms described above. The longitudinal stick motion 28 representing the pilot's pitch control movement is transmitted via suitable linkage means $k$ to one end of an input summing lever $m$; the opposite end of the latter receives an input from the pitch stability system actuators 44. The sum of the motion inputs to summing lever $m$ is received by a bellcrank $n$, the latter being pivoted about fixed pivot $o$. Pivoted at one end to the free end of bellcrank $n$ is a link $p$, the opposite end of the latter being connected at pivot point $o'$ both to cam follower $q$ for movement therewith in accordance with the profile of cam 64 and the angle of wing tilt $i_w$, and to an output link $r$ which transmits via suitable mechanism $s$, movement to the pitch change mechanism (not shown) of the tail propeller 18.

The cam 64 is profiled such that when $i_w$ is zero, the pivot axes $o, o'$ are in substantial alignment. When this occurs, input longitudinal stick motion causes simple pivotal motion of link $p$ and bellcrank $n$ about the same axes $o$—$o'$ with no output being transmitted via links $r$ and mechanism $s$ to the tail rotor. When $i_w$ is greater than zero, longitudinal stick motion is transmitted to the pitch change mechanism of the tail rotor as a function of $i_w$ and the profile of cam 64. A typical gain program for average longitudinal trim conditions will be described hereafter with reference to FIGS. 9 and 9B.

Before proceeding to a detailed description of the actual mechanism used in the programming and mixing unit 22, it is desirable to illustrate further the manner in which the above-mentioned differential outputs of the latter are combined with the previously mentioned collective contributions to provide a net propeller blade pitch change output and a flap-aileron setting.

FIG. 5 illustrates the main elements of the propeller blade pitch changing mechanism. As stated previously, the propeller constant speed governors 37 monitor a collective blade pitch control mechanism 38, the latter also preferably receiving an input related to the power setting of the aircraft engines thereby to produce a collective pitch output at lever 70. Further details of the collective blade pitch angle control mechanism are not shown here but form the subject matter of U.S. Letters Pat. No. 3,518,022 issued Jun. 30, 1970.

Movement of the pilot's rudder pedal is transmitted via suitable linkage means 80 to the programming and mixing unit 22 thereby to actuate input lever 81, the latter being pivotally mounted on unit 22, thereby providing control input movement 30 referred to in schematic diagrams 2, 3 and 4. Linkage means is also connected to the rudder 15 shown in FIG. 1 in conventional fashion.

The collective pitch change output lever 70 is connected to push-pull rods 71 which extend transversely of the aircraft and are connected via any suitable lever and linkage means 72 to a shaft 71a, the angular position of the latter being determined by the collective blade pitch setting. The shaft 71a is connected at its opposite end to a blade angle summing mechanism 39 thereby forming one input to the latter.

The differential pitch output of the programming and mixing unit 22 controls the pivotal movement of lever 74, the latter being connected to lever 75' via elongated rod 76. Angular movement of lever 75' causes rotation of hollow shaft 75 (the latter surrounding shaft 71a) to provide, (not shown), the second input to the blade angle summing mechanism 39. The blade angle summing mechanism 39 is not shown in any detail since suitable mechanisms for summing two motion inputs to produce a net motion output are well known, particularly in the aeronautical art. For example, a simple summing lever such as levers 54 or 55 might be appropriate; however, space requirements may dictate the use of a somewhat more sophisticated design.

The manner in which the flap-ailerons 12, 12' are controlled is clearly illustrated in FIGS. 6, 6A and 6B. Lateral movement of the pilot's stick is transmitted via conventional linkage means 86 and input lever 87, to the mixing and programming unit 22 thereby providing command input 29 referred to previously particularly in FIGS. 2, 3 and 4. The differential flap-aileron output appears at lever 89, the latter being connected to the flap-aileron summing mechanism 33 shown at FIG. 6B.

The summing mechanism 33 includes spaced levers 91 and 92 pivoted about pins 91a and 92a intermediate their opposing ends and mounted within elongated bracket 93, the latter having elongated slots 91b, 92b, within which the pivot pins 91a and 92a are slidably located. A lever 95 is also pivoted in bracket 93 about pivot pin 95a the latter being intermediate levers 91 and 92 and lever 95 is pivotally connected to pivot pins 91a and 92a, at points spaced from pivot pin 95a by connecting links 96, 97 respectively. Hence pivotal motion of lever 95 moves the pivot pins 91a, 92a closer together or further apart depending on the direction of the pivotal motion. The lower ends of levers 91 and 92 receive a flap-aileron differential motion input from the lever 89 via connecting links 90, 90a, 90b and 90c. The upper ends of levers 91 and 92 are pivotally connected to elongated rods 98, 99 respectively, rod 98 being connected via conventional linkage means 100 to flap-aileron servoactuator 101 which actuates flap-aileron 12 while rod 99 is connected to a similar type of mechanism on the opposite side of the aircraft for control of flap-aileron 12'. The tilting motion of wings 11, 11' is transmitted by conventional means to cause rotation of suitably profiled programmed cam 102. Pivotally mounted cam follower 103 is connected to lever 104, the latter being connected to the intermediate lever 95 via link 106. Hence, as the wings are rotated from the normal flight position to the vertical flight position, rotation of programming cam 102 causes a change in the distance between pivot points 91a and 92a, hence causing movement of elongated control rods 98 and 99 in opposite directions and causing collective movement of the flap-ailerons 12, 12' in a common direction. On the other hand, pivotal motion of lever 89, representing the flap-aileron differential motion output causes pivotal movement in the same direction of levers 91 and 92, hence shifting the elongated control rods 98 and 99 in the same direction and causing motion of the flap-ailerons 12, 12' in opposite directions. It will be realized of course that the flap-aileron motion will be always related to the sum of the collective and differential motion inputs to the summing mechanism 33.

Cam 103 is programmed in such a manner as to obtain a collective flap motion which is a preset function of wing tilt angle. A typical plot of the collective flap-aileron motion versus wing tilt angle in degrees is shown in FIG. 6A. From this plot, it will be seen that the collective flap-aileron angle is zero in normal flight and very small (1° or 2°) in vertical or hovering flight when wing tilt angle is 90°. The maximum flap angle is reached at a wing tilt angle of roughly 45°. The collective flap motion is shown as being negative since such motion is in an angular direction opposite to the angular direction of wing tilt.

The theory of operation, together with the basic mechanisms involved in the roll and yaw variable gain programming assemblies 51 and 53 have been described previously particularly in conjunction with FIGS. 3 and 4. As was seen in FIG. 4, each of the variable gain programming assemblies 51 and 53 comprises a pair of variable gain mechanisms, the gain of each being controlled by a suitable profiled programming cam. Since the variable gain programming assemblies 51 and 53 are built exactly alike, except for the programming cams which are profiled to suit their particular programming functions, it is necessary to explain in detail the physical structure of only one assembly, as for example the lateral stick motion programming assembly 51, reference being had to FIGS. 7 and 8.

The central programming and mixing unit 22 includes a suitable housing to protect the moving parts from contamination by dust and debris. Preferably, the housing is designed such that a portion thereof may be removed to permit maintenance and to permit removal of and replacement of the various parts, namely the programming cams. The entire unit 22 may be located in any desired and suitable position within the aircraft; preferably it is located substantially as shown in FIG. 1 i.e. in a position somewhat rearwardly of the center of gravity of the aircraft and at a level approximating the level of the wing tilt axis A—A.

Referring particularly to FIG. 7, there is shown a first portion of the central programming and mixing unit 22 including a suitable housing 109. Extending transversely of housing 109 and mounted for rotation in suitable bearing means (not shown) is a shaft 59 upon which are mounted the several programming cams including the cams for the roll and yaw programming assemblies 51 and 53 together with the cams for the tail propeller and horizontal stabilizer programming assemblies shown in FIG. 9. As described previously in connection with FIG. 4, shaft 59 upon which are is connected such that is is rotated by an angle which is a predetermined proportion of the angle of wing tilt. Tilting of the wing upwardly rotates shaft 59 clockwise as shown in FIG. 7. The variable gain programming and mixing units 51 and 53 are supported by means of respective support brackets 110, 110' respectively, the latter extending outwardly from a rear wall portion of the housing 109.

Mounted on the shaft 59 are four suitably profiled programming cams; such programming cams are shown schematically in FIG. 4. However, in order to simplify FIG. 7, only one programming cam 60 is illustrated. Reference should also be had to FIG. 8 wherein an exploded view of the variable gain mechanism controlled by cam 60 is illustrated; like reference numerals in FIGS. 7 and 8 illustrate like parts and the heavy lines in FIG. 8 illustrate certain pivotal connections between the parts so joined. The programming cam 60 has a suitably profiled groove 111 therein; this groove 111 is so profiled that the variable gain assembly associated therewith performs in the manner indicated by the graph of FIG. 4D referred to previously. The cam 60 has a substantially U-shaped opening 112 therein large enough to allow insertion of the cam on the shaft 59. A flanged collar 113 is mounted on the shaft 59 and is secured thereto for rotation therewith. The cam 60 is attached to the flanged collar member 113 by a plurality of screw or bolt fasteners 114; removal of the fasteners 114 permits ready removal of cam 60 should it be desired to replace the latter either for purposes of effecting a programming change or for maintenance purposes. A cam follower lever 117 having a cam follower 116 fixes thereto is pivotally mounted to bracket 110 at pivot 115. The cam follower 116 is dimensioned as to be snugly and slidably received within the programmed groove 111. The free end of cam follower lever 117 is pivotally connected at one end of a link 118. The other end of link 118 is connected pivotally both to respective ends of a forked link 120 and a further link 131. The other end of forked link 120 is pivotally connected at pivot 122 to a rocking lever 123, the latter being pivotally mounted on bracket 110 via fixed pivot 124. The rocking lever 123 is in turn pivotally connected to push-pull rod 69, the latter having been previously referred to in connection with FIG. 4. It will be realized here that the output of the variable gain assembly controlled by the programming cam 60 appears or is transmitted via the push-pull rod 69. Pivotally mounted on bracket 110 at fixed pivot 127a is a bellcrank lever 127 the latter having long leg and short leg portions angularly disposed with respect to each other. The free outer end of the long leg portion of bellcrank lever 127 is pivotally connected to the end of link 131 opposite to the end of the latter connected to forked link 120 and the one end of link 118. It is important to note here that the length of the long leg of bellcrank lever 127 and the length of link 131 must be chosen such that as the cam follower lever 117 is rotated, hence causing movement of the link 118 and fork lever 120 and connecting link 131, that the pivot axis whereat the latter mentioned three links are attached together (hereinafter referred to as pivot axis 121) travels in a path which, at one angular position of programming cam 60, intersects and corresponds with the fixed pivot axis 127a of the bellcrank lever 127. When the pivot axis 121 corresponds with the axis of pivoting of bellcrank lever 127, the mechanism has no gain.

In order to provide an input to the mechanism, the lateral stick motion input, designated as 29 in both this and previous drawings, is applied to the lower end portion of an input summing lever 133.

The input summing lever 133 is pivotally connected at pivot point 130 to the free end of the short leg portion of bellcrank lever 127. The extreme upper end of the input summing lever 133 is connected pivotally to a push-pull rod 135, the axial position of the latter being determined in accordance with the stability augmentation system actuator output as controlled by the actuator 45 acting through the pivotally mounted link member 136. Hence, it will be readily seen that the angular position of bellcrank lever 127 comprises the algebraic sum of the lateral stick input motion 29 and the stabilizing motion provided by the actuator 45. When the mechanism is in the position shown in FIG. 7, with pivot axis 121 aligned with the fixed axis of pivoting 127a of bellcrank lever 127, the gain or output of the system is zero since pivotal movement of bellcrank lever 127 causes simple pivotal motion of connecting link 131 about pivot axis 121, with no transmittal of motion via forked link 120 to the output push-pull rod 69.

One important difference to be noted between the actual structure shown in FIG. 7 and the somewhat schematic arrangement shown in FIG. 4, is that while the latter arrangement has shown separate input summing and bellcrank levers for each of the individual variable gain mechanisms, the structure shown in FIG. 7 actually uses only a single input summing lever and bellcrank lever for each pair of variable gain mechanisms. The second variable gain mechanism has an output which is transmitted via the push-pull rod 68, previously referred to in connection with FIG. 4, thereby to provide a contribution to the pitch setting of the main propellers. The output push-pull rod is connected to a rocking lever 123' the latter being pivoted to fixed pivot 124'. The cam follower lever 117' controlled by a further programming cam (not shown for purposes of clarity), has its free end pivotally attached to link 118' with the latter in turn being pivotally connected to the forked lever 120'. Forked lever 120' is connected at its opposite end to the rocking lever 123'. A connecting lever 131' having one end thereof pivotally attached to the free outer end of the long arm of bellcrank lever 127 and the opposing end pivotally connected to the point of pivotal attachment of links 120' and 118' functions in exactly the same manner as the mechanism described previously. When the programming cam controlling the angular position of cam follower lever 117' moves the latter to a position such that the common pivot axis 121' of members 120', 118' and 131' is in substantial alignment with the fixed axis of pivot 127a of bellcrank lever 127, the gain of the assembly is zero. Since the two variable gain assemblies which together comprise the subassembly designated at 51 are, save as set out below, identical to one another with the exception of their respective programming cams, it can readily be seen that the cams, links, and levers involved in the mechanisms are disposed as mirror images of one another relative to a plane normal to shaft 59 and passing through input summing lever 133, it being realized that the angular dispositions of the various levers may not correspond with one another by virtue of the differences between the programming cams associated with each mechanism.

Since the variable gain programming subassembly 53 is, with the exception of its programming cams, (not shown in FIG. 7 for purposes of clarity) identical to assembly 51, further description of the same is believed unnecessary. The outputs of the assembly 53 are transmitted via push rods 67 and 69 to suitable summing mechanism to be hereinafter described thereby to provide the propeller differential blade pitch setting output at pivotally mounted lever 74.

As previously mentioned, the flap-aileron differential output is transmitted by push rods 69 and 67, the latter being pivotally connected to opposite ends of summing lever 54. The summing lever 54 is pivotally mounted at pivot point 140 on the free end of a lever 141. Lever 141 is mounted for pivotal motion about a vertically disposed axis 142, the latter pivot axis being fixed with respect to the housing 109 of the programming and mixing unit 22. Affixed to the central portion of summing lever 54 is an arm 143, the free end of the latter being pivotally attached to link 144. The other end of link 144 is connected to an outwardly extending arm 145, the latter being connected to member 146. Member 146 is journaled for rotation about axis 142. The member 146 is provided with a further lever portion 147, the free outer end of the latter being connected to a rod 148. Rod 148 is attached at its other end to slotted lever arm portion 149 of the pivotally mounted lever member 89. Suitable means are provided for varying the distance between the rotation axis of lever 89 and the point of pivotal attachment of rod 148 and the lever portion 149. In like manner the propeller differential pitch setting outputs are transmitted via push-pull rods 68 and 69 to opposite ends of summing lever 55. The summing lever 55 is pivotally mounted at its mid portion to a lever arm 150, the latter being in turn connected to a member 151 pivoted about vertical axis 152. Pivotal motion of member 150 is transmitted to the propeller differential pitch output lever 74 by means of lever arm 153 originally connected to member 151, push-pull rod 154 pivotally connected to the free end of arm 153 and having its opposite end pivotally attached in a suitable manner to a further arm formed integrally with the arm 74. In view of the fact that summing lever 55 is pivotally attached to arm 150, pure pivotal motion of summing lever 55 does not effect pivotal movement of the output arm 74. Only the rectilinear motion component of summing lever 55 causes movement of the differential propeller pitch output lever 74. On the other hand, it is readily apparent from FIG. 7 that the rectilinear motion component of summing lever 54 has little effect on the flap-aileron differential output from lever 89. The angular motion component of summing lever 54 provides via arm 143, link 144 and arm 145, almost the total contribution to the differential flap-aileron output.

In the system shown in FIGS. 7 and 8, it was noted that when the controls were in the neutral position, the pivot axis 122 was aligned with the pivot axis 132 When the cam 60 is rotated such that the pivot axis 121 is in alignment with pivot axis 127a, the gain of the system is zero. Furthermore wing tilt motion simply causes pure pivotal motion of the forked link 120 with no motion being transmitted to the push-pull rod 69.

As soon as the wing is tilted upwardly thereby causing shaft 59 to rotate in the direction of the arrow shown in FIG. 7, the amount of misalignment between pivot axes 121 and 127a continually increases; however, it is important to note that there is a simultaneous decrease in the amount of misalignment between the pivot axis 121' of the variable gain programming mechanism positioned on the side of input summing lever 133 opposite to the side on which the mechanism controlled by programming cam 60 is situated. Hence, increasing wing tilt angle brings about decreased differential flap-aileron output for a given lateral stick input, and at the same time, increased differential propeller pitch change. A reduction in the angle of wing tilt causes the reverse action. Hence, it is readily seen that increased authority is given to the propulsion propellers for roll control in transitional and hovering flight while increased authority is transferred to the flap-ailerons for yaw control.

The programming assembly 53 assigned to yaw control acts in a similar fashion. At a wing tilt angle of zero, rudder pedal motion input 30 causes either little or no movement of push-pull rod 66 (and hence little or no change in propulsion propeller differential blade angle) since the gain of the mechanism associated therewith at zero wing tilt is preferably zero or as an alternative only slightly greater than zero (see FIG. 4A), but there is no motion of push-pull rod 67 since the gain of its mechanism is zero at a zero wing tilt angle (see FIG. 4B). However, as wing tilt angle increases, rudder pedal movement causes predetermined amounts of movement in each of push-pull rods 66 and 67 in accordance with the programmes for the mechanisms associated therewith. At a 90° wing tilt angle, rudder pedal motion effects movement only of push-pull rod 67, hence effecting a change in the flap-aileron differential setting only. As mentioned earlier, rudder pedal motion causes movement of rudder 15 at all times even though the latter is ineffective in vertical flight and only partially effective in transitional flight. Hence, it is seen that there is a transfer of yaw control authority from the rudder 15 and propulsion propellers 20, 20' to the flap-ailerons 12, 12' in going from normal to vertical or hovering flight and vice versa.

Referring now to FIG. 9, there is shown the actual details of construction of the programming assembly for the horizontal stabilizers 16, 16'; this assembly was designated as 57 in FIG. 4. Also shown in FIG. 9 is the pitch programming assembly 49 for the tail propeller 18. Both of the assemblies 49 and 57 are located within the housing 109 for the central programming mixing unit 22 and they both receive their programming input via suitable programmed cams fixed to the common shaft 59, the latter as we have seen previously receiving rotary movement which is a predetermined function of the angle of wing tilt.

Dealing firstly with the horizontal stabilizer programming assembly 57, it will be seen from FIG. 9 that a programming cam 65 is affixed to the shaft 59 by a flange and screw fastener means in the same manner as the cam 60 is attached to shaft 59 for easy removal and replacement thereof. The cam 65 has a suitably profiled groove 160 within which runs a cam follower 161. Cam follower 161 is attached to a follower lever 162, the latter being free to pivot about the fixed pivot 163. The cam follower lever 162 is pivotally connected at 164 to push-pull rod 165 which transmits an output through a pivoted connection 166 to a lever 167. The lever 167 is pivoted about fixed pivot 168, lever 167 being rigidly affixed to a reversing lever 169. The free end of lever 169 is provided with means for providing a pivotal connection to a further motion transmitting member 170, the latter being shown only in dotted lines. The motion transmitting member 170 is connected directly to the actuating mechanism for horizontal stabilizers 16, 16'. Since this mechanism is believed to be old and well known in the art, it is not specifically shown in the drawings.

The groove 160 within the programming cam 65 is profiled such that the horizontal stabilizers 16, 16' are tilted as a predetermined function of the angle of tilt of the wings 11, 11'. The graph of FIG. 9a illustrates a typical plot of horizontal stabilizer tilt angle $i_t$ as a function of wing tilt angle $i_w$. It will be noted from this plot that the angle $i_t$ is zero for a wing tilt angle $i_w=0$. However, as $i_w$ increases, the angle $i_t$ rapidly increases, reaching a maximum at roughly 45° $i_w$. Further increase in the wing tilt angle $i_w$ causes a correspondingly rapid decrease in the angle $i_t$ with the angle $i_t$ becoming substantially zero at a wing tilt angle of approximately 90°. Those skilled in the art will realize that the graph of FIG. 9a represents only a typical horizontal stabilizer program; other programs may also be suitable depending upon the aerodynamic characteristics of the particular aircraft of which the system of the present invention forms part.

Referring now to the pitch programming assembly 49 for the tail propeller 18, there is provided a programming cam 64 removably mounted on flange 171, the latter being secured to shaft 59. Cam 64, as with the previously described programming cams, has a suitably profiled groove 172 in which runs a cam follower 173, the latter being attached to a follower lever 174 which is free to pivot relative to a fixed pivot 175. The follower lever 174 is pivotally attached at pivot 176 to one end of a link 177. The opposing end of link 177 is forked and has pivotally attached thereto at 178, a connecting rod 180 and a connecting link 179. The link 179 is attached at is opposing end at pivot point 181 to a triangle-shaped member 182, the latter being pivotally mounted for rotation about a fixed pivot axis 183. It will be noted here that the pivot axes 181 and 183 are disposed adjacent two of the apices of the triangle-shaped member 182, while a further pivot axis 184 is provided adjacent the remaining apex of 182. The pivot axis 184 provides a pivotal point of connection for an input summing lever 185, the latter receiving the pilot's command signal together with a stabilizing signal from the stability augmentation system previously referred to. The first input to the summing lever 185 is transmitted by the push-pull rod 195, the latter being moved in accordance with the longitudinal stick motion as controlled by the pilot via member 197, the latter being mounted for rotation about a fixed vertical axis 196. Member 197 has a first arm 199 receiving the longitudinal stick motion and a second arm 198 pivotally connected to one end of the push-pull rod 195. The other end of rod 195 is pivotally connected at 194 to the lower end of the summing lever 185. The other end of the summing lever 185 is connected to a further push-pull rod 193, the latter being pivotally connected at 192 to an arm 191. The arm 191 is connected to a shaft 190, the latter being mounted for rotation about a fixed pivot axis concentric with the axis of shaft 190. Connected to the end of shaft 190 opposite to the end at which arm 191 is attached is a crank arrangement 189. Pivotally connected at its intermediate portion to the crank 189 is a further summing lever 188, the latter being pivotally connected at its ends to piston rods 186 and 187. The piston rods are associated with a pair of actuators indicated at 44. The actuators 44, as described previously with reference to FIG. 3, receive an input from the pitch stability augmentation system gyro shown as 41 in FIG. 3.

The output of the tail propeller pitch programming assembly 49 is transmitted via push-pull rod 180 and motion reversing means 181' directly to the tail rotor pitch change mechanism. Since suitable pitch change mechanisms for the tail rotor are well known to those skilled in the art, the same is not specifically shown in the drawings.

It is to be noted here that the triangle-shaped member 182 and the link 179 are so dimensioned that the distance between the pivot axis 178 and the pivot axis 181 is the same as the distance between pivot axis 183 and the pivot axis 181. When the pivot axes 183 and 178 are substantially in alignment, the gain of the entire mechanism is zero. That is, longitudinal stick motion from the pilot, or alternatively a motion input from the stability augmentation system to the triangle-shaped member 182, simply causes pure pivotal motion of connecting link 179 about the pivot axis 178 with no motion being transmitted to the push-pull rod 180. This is the condition which occurs when the angle of tilt of wings 11, 11' is zero. In other than normal flight, i.e. when the wing tilt angle is greater than zero, the gain of the mechanism is always at some value other than zero as shown in the typical programming plot of FIG. 9B. The programming plot shown in FIG. 9B is for average longitudinal trim conditions and it will be noted that the blade angle of the tail propeller 18 is always greater than zero when the wing tilt angle is greater than zero; this is to provide a minimum setting for lift purposes. At any angle of wing tilt, a certain variation in blade angle ($\Delta\beta_t$) is provided thereby to give the pilot a sufficient range of blade angle setting for trimming and aircraft pitch control purposes. As mentioned previously, in connection with FIGS. 2 and 3 particularly, the longitudinal stick motion 28 is always transmitted to the elevators, even if the latter are completely ineffective for control purposes, as for example in vertical or hovering flight. The mechanism for transmitting this movement to the elevators is shown as 200; the actual mechanism used is not shown since it is entirely conventional and well know to those skilled in the art.

Also shown in FIG. 9 is a suitable mechanism for transmitting the wing tilt motion to the shaft 59 on which the various programming cams are mounted. As shown, wing tilt motion is transmitted via push-pull rod 201 to lever arm 203, the latter being attached to shaft 204 mounted for rotation about fixed pivot axis 205. Shaft 204 is connected to a cam lever 206, the latter having an elongated groove 207 provided adjacent its free outer end and shown in dotted lines in FIG. 9. Slidably positioned within the elongated groove 207 is a cam follower 208, the latter being connected to a cam follower lever 209. The cam follower lever 209 is rigidly secured at 210 to one end of the shaft 59. It will be realized that the above described mechanism is only one of many which would be suitable for transmitting the wing tilt motion to the shaft 59; other arrangements will be obvious to those skilled in the art.

It will be apparent from the programming plot of FIG. 9B that the programming cam 64, besides varying the gain of the assembly 49, is responsible for introducing a tail rotor pitch setting input. This is in contrast to the programming cams for the variable gain assemblies 51 and 53 previously described with reference to FIG. 7. In the latter mentioned assemblies, the programming cams are responsible only for varying the gain of the mechanisms with which they are associated; both of the systems are so arranged that rotation of the shaft 59 produces no change in setting of the attitude control elements associated therewith.

In the tail propeller pitch control assembly 49, it will be realized that the lengths and configurations of the cam follower lever 174, link 177 and push-pull rod 180 must be so chosen relative to one another such that the proper adjustment in blade pitch angle of the tail propeller 18 is achieved as the programming cam 64 is rotated. When the programming cam 64 is rotated, besides shifting the position of the push-pull rod 180, the pivot axis 178 is shifted, from alignment with the fixed pivot axis 183 (which is the position in normal flight when wing tilt angle is zero) to a disaligned position with the amount of disalignment being related to the angle of wing tilt. When the pivot axis 178 is aligned with the fixed pivot axis 183, pivoting of the triangle-shaped member 182 causes simple pivoting movement of link 179 about the aligned axes 178 and 183. Therefore, in normal flight, the pilot's pitch command input 28, which is transmitted via the mechanism previously described to the triangle-shaped member 182, causes pivotal movement of the latter but no motion is transmitted through the link 179 to cause movement of the push-pull lever 180 and an input to the tail rotor pitch change mechanism. However, as soon as the wings are tilted causing rotating of shaft 59 and programming cam 64, the pivot axes 178 and 183 become disaligned. Therefore, in transitional and vertical hovering flight, longitudinal stick motion by the pilot is transmitted via the summing lever 185 through triangle-shaped member 182 and link 179 to rod 180 with the latter in turn transmitting an input to the tail rotor pitch change mechanism. Therefore, in all flight modes with the exception of normal horizontal flight at zero angle of wing tilt, the pilot is afforded manual control of the propeller blade angle. The pilot's manual command signal of propeller blade angle is algebraically superimposed on the automatically programmed blade angle value provided by the particular configuration of the groove 172 in programming cam 64 thereby to give a net pitch setting for the tail propeller 18. The maximum amount of manual command, for any particular wing tilt angle is approximately a fixed proportion of the automatically programmed value at that angle; this is apparent from the graph of FIG. 9B wherein it will be seen that the degree of blade pitch change permitted by manual control is approximately equal to the programmed value at any angle of wing tilt.

SOME MODIFICATIONS AND VARIATIONS

As mentioned earlier, the present invention is applicable to aircraft having independent flaps and ailerons. This modification is schematically illustrated in FIG. 10 wherein there is schematically illustrated the left-hand airfoil surface 250 of an aircraft having an independent flap 252 and an aileron 254. The right-hand airfoil surface is not shown, but of course is the same as for the left-hand.

The modified system includes the central programming and mixing unit 22. The output lever 89 is directly connected via suitable linkages 256, 258 and 260 to the left-hand aileron 254 and by similar linkage to the right-hand aileron whereby movement of the output lever 89 causes differential deflection of the right- and left-hand ailerons. In a similar fashion, the left-hand flap 252 and the right-hand flap are connected for collective motion under control of the cam 102, the latter as was seen previously being connected for rotation with the aircraft wings. Cam follower 103 imparts, via the linkages 262, 264 and 266 the required amount of collective motion to the aircraft flaps.

The modified system described above functions in essentially the same way to achieve the same effect as the system incorporating the flap-ailerons; the summing mechanism shown in FIG. 6B is, of course, not necessary in the modified version.

It should be appreciated that in the tilt wing type of aircraft which has just been described, the wing affords a means for tilting the laterally spaced thrust producers mounted thereon. In the tilt pod-type of VTOL aircraft, that is, aircraft having tiltable laterally spaced thrust producers wherein the wing is fixed and means are provided to tilt the laterally spaced thrust producers relative to the wing and fuselage a control system very similar to the one described above may be employed. In the tilt-pod type of aircraft, an additional auxiliary yaw attitude control means is provided to assume or assist in the yaw control of the aircraft during transitional, vertical, and hovering flight modes.

I claim:

1. In a VTOL aircraft of the tilt wing-type having a wing mounted on said aircraft and extending from opposite sides of the fuselage of the aircraft, means for tilting said wing between substantially horizontal and substantially vertical positions, laterally spaced thrust producers associated with said wing, control surfaces attached to said wing in positions to intercept gas streams induced by said laterally spaced thrust producers, elevators and a rudder associated with said aircraft, and a vertical thrust producer positioned rearwardly on said aircraft, means responsive to a controlling input thereto to differentially vary the settings of said control surfaces, means responsive to controlling inputs thereto to differentially vary the thrusts of the laterally spaced thrust producers, means to vary the thrust of said rearwardly positioned thrust producer, pilot's control means for producing pitch, roll and yaw control signals, means connecting the pilot's control means to said rudder and said elevators to transmit yaw and pitch control signals respectively, a control unit comprising in combination:

a. pitch, roll and yaw programming assemblies each having one input connected to receive pilot's pitch, roll and yaw control signals respectively from said pilot's control means;

b. a further controlling input means operatively associated with each of said pitch, roll, and yaw programming assemblies;

c. means connecting said further controlling input means for actuation in accordance with the tilting motion of the wing, d. said pitch programming assembly having an output connected to said means for varying the thrust of said rearwardly positioned thrust producer, the pitch programming assembly being constructed and arranged to respond to the further controlling input means by providing for transmission of pilot's pitch control signals between its input for pilot's pitch control signals and its output when said wing is tilted to a substantially vertical position, and further being arranged to progressively decrease the amounts of pilot's pitch control signals transmitted from its input to its output as said wing is tilted back to a horizontal position;

e. said yaw and roll programming assemblies each having first and second output means, the first output means of each of said jaw and roll assemblies being connected to the means to differentially vary the thrusts of the laterally spaced thrust producers, and the second output means of each of said yaw and roll assemblies being connected to the means to differentially vary the settings of the control surface means, f. said yaw programming assembly being arranged to transmit pilot's yaw control signals between its input for yaw control signals and its first output means to provide for a controlling input to the means to differentially vary the thrusts of the laterally spaced thrust producers when said wing is tilted to a position intermediate the vertical and horizontal positions, said yaw programming assembly further being arranged to respond to the further controlling input by transmitting pilot's yaw control signals between its input for yaw control signals and its second output means to provide for a controlling input to the means to differentially vary the settings of the control surfaces when said wing is tilted to a vertical position and to gradually decrease the amount of pilot's yaw control signals transmitted to said second output as the wing is tilted back to horizontal position; and g. said roll programming assembly including means arranged to respond to said further controlling input by providing for transmission of pilot's roll control signals between its input for roll control and the first output means thereof to provide for a controlling input to the means for differentially varying thrusts of the laterally spaced thrust producers when said wing is tilted to a substantially vertical position, said roll programming assembly also including means to gradually decrease the amounts of pilot's roll control signals transmitted between its input and its first output means and to gradually increase the amounts of pilot's roll control signals transmitted between its input for roll control signals and its second output to provide for a controlling input to the means to differentially vary the settings of the control surfaces when the wing is tilted back to horizontal position; and h. at least one of said pitch, yaw and roll programming assemblies including a variable gain mechanism comprising; a programming cam connected to said further controlling input means so that it is moved to positions in accordance with the angle of tilt of said wing and a linkage mechanism associated with said programming cam and connected between the programming assembly's input for pilot's control signals and its associated output with said linkage mechanism arranged such that movement of said programming cam in response to tilting motion of said wing alters the configuration of the linkage mechanism in such a way as to vary in predetermined manner said amounts of pilot's control signals transmitted from the input of such programming assembly to its output.

2. Apparatus according to claim 1 further including means providing a collective control surfaces deflection output setting as a function of wing tilt angle, and means summing said collective control surfaces output deflection with the differential deflection output setting provided by said means for differentially varying the control surfaces settings thereby to obtain a net control surfaces setting, means providing a collective thrusts setting for the laterally spaced thrust producers, and means summing said collective thrusts setting with the differential thrusts setting provided by the means for differentially varying the thrusts of the laterally spaced thrust producers to provide a net output setting for each of the latter.

3. The VTOL aircraft according to claim 1 wherein said pitch programming assembly includes one such variable gain mechanism and said yaw and roll programming assemblies each include two such variable gain mechanisms, the linkage mechanism of each variable gain mechanism being connected between the input for pilot's control signals and a respective output of the programming assembly with which it is associated, with each programming cam being contoured to effect the changes in the amounts of pilot's control signals transmitted between the input and the output of the variable gain mechanism with which it is associated.

4. The VTOL aircraft according to claim 3 wherein said further controlling input means includes shaft means arranged for rotation to angular positions in accordance with the angle of tilt of said wing, the programming cams being connected to and arranged for rotation with said shaft means.

5. In a VTOL aircraft of the tilt wing-type, having a wing mounted on said aircraft and extending from opposite sides of the fuselage of the aircraft, means for tilting said wing between substantially horizontal and substantially vertical positions, laterally spaced thrust producers associated with said wing, control surfaces attached to said wing in positions to intercept gas streams induced by said laterally spaced thrust producers, elevators and a rudder associated with said aircraft, and a vertical thrust producer positioned rearwardly on said aircraft, means responsive to a controlling input thereto to differentially vary the settings of said control surfaces, means responsive to controlling inputs thereto to differentially vary the thrusts of the laterally spaced thrust producers, means to vary the thrust of said rearwardly positioned thrust producer, pilot's control means for producing pitch, roll and yaw control signals, means connecting the pilot's control means to said rudder and said elevators to transmit yaw and pitch control signals respectively, a control unit comprising in combination:

a. pitch, roll and yaw programming assemblies each having one input connected to receive pilot's pitch, roll and yaw control signals respectively from said pilot's control means;

b. a further controlling input means operatively associated with each of said pitch, roll and yaw programming assemblies;

c. means connecting said further controlling input means for actuation in accordance with the tilting motion of the wing, d. said pitch programming assembly having an output connected to said means for varying the thrust of said rearwardly positioned thrust producer, the pitch programming assembly being constructed and arranged to respond to the further controlling input means by providing for transmission of pilot's pitch control signals between its input for pilot's pitch control signals and its output when said wing is tilted to a substantially vertical position, and further being arranged to progressively decrease the amounts of pilot's pitch control signals transmitted from it input to its output as said wing is tilted back to a horizontal position;

e. said yaw and roll programming assemblies each having first and second output means, the first output means of each of said yaw and roll assemblies being connected to the means to differentially vary the thrusts of the laterally spaced thrust producers, and the second output means of each of said yaw and roll assemblies being connected to the means to differentially vary the settings of the surface means;

f. said yaw programming assembly being arranged to transmit pilot's yaw control signals between its input for yaw control signals and its first output means to provide for a controlling input to the means to differentially vary the thrusts of the laterally spaced thrust producers when said wing is tilted to a position intermediate the vertical and horizontal positions, said yaw programming assembly further being arranged to respond to the further controlling input by transmitting pilot's yaw control signals between its input for yaw control signals and its second output means to provide for a controlling input to the means to differentially vary the settings of the control surfaces when said wing is tilted to a vertical position and to gradually decrease the amount of pilot's yaw control signals transmitted to said second output as the wing is tilted back to horizontal position;

g. said roll programming assembly including means arranged to respond to said further controlling input by providing for transmission of pilot's roll control signals between its input for roll control and the first output means thereof to provide for a controlling input to the means for differentially varying thrusts of the laterally spaced thrust producers when said wing is tilted to a substantially vertical position, said roll programming assembly also including means to gradually decrease the amounts of pilot's roll control signals transmitted between its input and its first output means and to gradually increase the amounts of pilot's roll control signals transmitted between its input for roll control signals and its second output to provide for a controlling input to the means to differentially vary the settings of the control surfaces when the wing is tilted back to horizontal position; and h. wherein said pitch programming assembly comprises a variable gain mechanism including a programming cam connected to said further controlling input means and being moved in accordance with the angle of tilt of said wing, and link and lever means associated with said programming cam connected between the pitch control input of the pitch programming assembly and the output thereof and constructed and arranged such that movement of the programming cam alters the configuration of said link and lever means thereby to vary in a predetermined manner the amount of pitch control movement transmitted therethrough to the output of the pitch programming assembly.

6. In a VTOL aircraft according to claim 5 wherein said programming cam is designed to provide predetermined minimum output settings at every angle of wing tilt greater than zero thereby to induce in said rearwardly positioned thrust producer at every angle of wing tilt greater than zero at least a minimum lifting thrust.

7. The VTOL aircraft according to claim 5 wherein the yaw programming assembly comprises first, and second variable gain mechanisms, the first and second variable gain mechanisms assigned to yaw control including first and second programming cams connected to said further controlling input means thereby to be moved in accordance with said wing tilt motion, and first and second sets of lever and linkage means respectively associated with said first and second programming cams and connected between the yaw controlling input and the respective first and second outputs of the yaw programming assembly, said first programming cam and the set of lever and linkage means associated therewith being constructed and arranged that, with increasing wing tilt, the gain of the first variable gain mechanism first increases to a maximum, and thereafter gradually decreases to a zero value as the aircraft wing it tilted from a horizontal to a vertical position, said second programming cam and the lever and linkage means associated therewith being constructed and arranged such that as the wing is tilted from a horizontal to a vertical position, the gain of the second variable gain mechanism increases to a predetermined maximum value.

8. The VTOL aircraft according to claim 7 wherein the roll programming assembly comprises third and fourth variable gain mechanisms, the third and fourth variable gain mechanisms including third and fourth programming cams connected to said further controlling input means and hence being moved in accordance with said wing tilt motion, and third and fourth sets of lever and linkage means associated with said third and fourth programming cams and connected between the input thereto for roll control signals and the respective first and second outputs of the roll programming assembly, said third programming cam and the set of lever and linkage means associated therewith being constructed and arranged such that with increasing wing tilt the gain of the third variable gain mechanism increases from zero to a maximum value as the wing is tilted from a horizontal to a vertical position, said fourth programming cam and the lever and linkage means associated therewith being constructed and arranged such that as the wing is tilted from a horizontal to a vertical position, the gain of the fourth variable gain mechanism increases from a predetermined value greater than zero to a maximum and thereafter decreases to zero.

9. The VTOL aircraft according to claim 8 wherein the further controlling input and the first, second, third and fourth programming cams of said yaw and roll programming assemblies are mounted upon a common shaft with the latter being rotated as a predetermined function of the angle of wing tilt, each of said programming cams being mounted on said shaft for ready removal and replacement thereby permitting the programming of said yaw and roll programming assemblies to be varied.

10. A mixing and programming unit according to claim 9 wherein said input for pilto's yaw control signals includes a yaw input lever which is pivoted about an axis parallel to said common shaft intermediate said first and second programming cams, said input for pilot's roll control signals includes a roll input lever which is pivoted about an axis parallel to said common shaft intermediate said third and fourth programming cams, each of said first, second, third, and fourth sets of lever and linkage means comprises interconnected variable gain levers, all the variable gain levers being pivotally connected about axes parallel to said common shaft with said first and second sets on opposite sides of the yaw input lever and the third and fourth sets on opposite sides of said roll input lever.

11. The invention set forth in claim 1 wherein said further controlling input means comprises at least one wing tilt input member mounted for rotation to angular positions determined by the tilt angle of said wing, said pitch, roll, and yaw programming assemblies each having at least one such variable gain mechanism with the respective programming cams thereof being of predetermined configurations and being adapted to vary the gain of their associated variable gain mechanisms in predetermined fashion as a function of wing tilt angle to effect said changes in the amount of pilot's control signal transmitted between the input and the corresponding outputs of the programming assemblies, said variable gain mechanisms including their associated programming cams being serially disposed along said wing tilt input member with said programming cams being attached to the latter to assume angular positions corresponding to the angular positions assumed by said wing tilt input member.

12. The invention according to claim 11 wherein said pitch roll, and yaw programming assemblies are disposed within a housing means, and wherein said wing tilt input member comprises an elongated shaft extending within and rotatably mounted with respect to said housing means.

13. The invention according to claim 8 wherein said aircraft further includes a horizontal stabilizer pivotally attached to the rearward portion thereof, a further programming assembly operatively associated with said wing tilt input member and output means for said further programming assembly operatively connected to said stabilizer to effect changes in the angle of incidence thereof in response to tilting of said wings.

14. The invention according to claim 13 wherein said further programming assembly is arranged to gradually increase the angle of incidence of said stabilizer to a maximum and to thereafter reduce said angle of incidence as said wing is tilted from a horizontal to a vertical position.

15. The invention according to claim 8 wherein the aircraft further includes means producing pitch, roll, and yaw stabilizing inputs, summing means to combine the pilot's yaw control signal to the yaw stability input to produce a net trimmed yaw input signal, summing means to combine the pilot's roll control signal with the roll stability input to produce a net trimmed roll input signal, and summing means to combine the pilot's pitch control signal to the pitch stability input to produce a net trimmed pitch input signal.

16. The VTOL aircraft according to claim 11 wherein the yaw programming assembly comprises a first and a second one of said variable gain mechanisms, the first and second variable gain mechanisms assigned to yaw control including respective first and second ones of said programming cams connected for rotation with said further controlling input means thereby to be moved in accordance with said wing tilt motion, the linkage mechanism of the variable gain mechanisms comprising first and second sets of lever and linkage means respectively associated with said first and second programming cams and connected between the yaw controlling input and the respective first and second outputs of the yaw programming assembly, said first programming cam and the set of lever and linkage means associated therewith being constructed and arranged such that with increasing wing tilt, the gain of the first variable gain mechanism first increases to a maximum, and thereafter gradually decreases to a zero value as the aircraft wing is tilted from a horizontal to a vertical position, said second programming cam and the lever and linkage means associated therewith being constructed and arranged such that as the wing is tilted from a horizontal to a vertical position, the gain of the second variable gain mechanism increases to a predetermined maximum value.

17. The VTOL aircraft according to claim 16 wherein the roll programming assembly comprises a third and a fourth one of said variable gain mechanisms, the third and fourth variable gain mechanisms including respective third and fourth ones of said programming cams connected for rotation with said further controlling input means and hence being moved in accordance with said wing tilt motion, the linkage mechanism of the variable gain mechanisms comprising third and fourth sets of lever and linkage means associated with said third and fourth programming camps and connected between the input thereto for roll control signals and the respective first and second outputs of the roll programming assembly said third programming cam and the set of lever and linkage means associated therewith being constructed and arranged such that with increasing wing tilt the gain of the third variable gain mechanism increases from zero to a maximum value as the wing is tilted from a horizontal to a vertical position, said fourth programming can and the lever and linkage means associated therewith being constructed and arranged such that as the wing is tilted from a horizontal to a vertical position, the gain of the fourth variable gain mechanism increases from a predetermined value greater than zero to a maximum and thereafter decreases to zero.

18. The invention defined in claim 11 further including a first summing means connected to said first outputs of the yaw and roll programming assemblies to sum the first outputs of the latter, and means connecting the summed first outputs of the latter to said means to differentially vary the thrusts of the laterally spaced thrust producers, a second summing means connected to said second outputs of the yaw and roll programming assemblies to sum the second outputs of the latter, and means connecting the second summing means to the means to differentially vary the settings of the control surfaces thereby rendering the latter responsive to the summed second outputs of said yaw and roll programming assemblies.

19. The invention according to claim 18 wherein said pitch programming assembly comprises a single variable gain mechanism connected between the pitch control input of the pitch programming assembly and its output and constructed and arranged such that movement of the programming cam alters the configuration of the linkage mechanism associated therewith to vary in a predetermined manner the amount of pitch control movement transmitted therethrough to said output, said programming cam being designed to provide predetermined minimum output settings at every angle of wing tilt greater than zero thereby to induce in said rearwardly positioned thrust producer at every angle of wing tilt greater than zero at least a minimum lifting thrust.

20. The invention according to claim 11 wherein said programming cams are removably mounted on said wing tilt input member.

21. Apparatus according to claim 11 further including means providing a collective control surface deflection output setting as a function of wing tilt angle, and means summing said collective control surface output deflection with the differential deflection output setting provided by said means for differentially varying the control surfaces settings thereby to obtain a net control surface setting, means providing a collective thrust setting for the laterally spaced thrust producers, and means summing said collective thrust setting with the differential thrust setting provided by the means for differentially varying the thrusts of the laterally spaced thrust producers to provide a net output setting for each of the latter.

22. The VTOL aircraft according to claim 1 wherein said laterally spaced thrust producers comprise motor driven variable blade pitch propellers.

23. The VTOL aircraft according to claim 22 wherein the rearwardly positioned thrust producer comprises a variable pitch propeller.

24. A mixing and programming unit for an aircraft having tiltable laterally spaced thrust producers, said unit being adapted to provide pitch, yaw and roll control outputs in response to the pilot's pitch, yaw and roll inputs thereto comprising:
   a. a pitch programming assembly having an input for pilot's pitch control signals and a pitch controlling output means;
   b. a roll programming assembly having an input for pilot's roll control signals and a roll controlling output means;
   c. a yaw programming assembly having an input for pilot's yaw control signals and a yaw controlling output means;
   d. a further input means comprising elongated shaft means operatively connected to each of said pitch, roll, and yaw programming assemblies, said shaft means being rotatably mounted and adapted to be connected for rotation to angular positions determined by the angle of tilt of said laterally spaced thrust producers;
   e. each of said pitch, roll, and yaw programming assemblies comprising variable gain mechanism interconnected between their respective inputs and their output means, each such variable gain mechanism being responsive to rotation of said input shaft means whereby the gain of each variable gain mechanism is a predetermined function of the angle of tilt;
   f. said pitch programming assembly comprising one variable gain mechanism arranged such that the gain thereof increases from zero to a maximum value as said input shaft is rotated in response to a tilt angle increase from zero to a maximum value;
   g. said yaw programming assembly comprising a first and a second variable gain mechanism;
      i. the first variable gain mechanism being arranged such that its gain first increases and thereafter decreases as said input shaft is rotated in response to a tilt angle increase from zero to a maximum, and
      ii. the second variable gain mechanism being arranged such that its gain increases to a maximum as said input shaft is rotated in response to a tilt angle increase;
   h. said roll programming assembly comprising a third and a fourth variable gain mechanism; and
      i. the third variable gain mechanism being arranged such that the gain thereof increases from zero as said input shaft is rotated in response to a tilt angle increase from zero, and
      ii. the fourth variable gain mechanism being arranged such that its gain first increases from a predetermined value greater than zero to a maximum and then decreases to zero as said input shaft is rotated in response to a tilt angle increase from zero to a maximum;
   i. the output means for the yaw and roll programming assemblies comprising first, second, third and fourth outputs respectively connected to said first, second, third and fourth variable gain mechanisms.

25. The invention as defined in claim 24, wherein said variable gain mechanisms are serially disposed along said elongated input shaft means.

26. The invention defined in claim 24 wherein each said variable gain mechanism comprises; a programming cam connected to said input shaft means for rotation therewith, and link and lever means operatively connected to said programming cam and interconnected between its input and output means and adapted to assume varied configurations in response to rotation of said programming cam to effect said increases and decreases in gain.

27. The invention defined in claim 26 wherein at least the yaw and roll programming assemblies are mounted within a common housing.

28. The invention defined in claim 24 further comprising means for summing together the outputs of the first and the third variable gain mechanisms, and further means for summing together the outputs of the second and fourth variable gain mechanism.

29. The invention according to claim 28 further comprising means providing pitch, roll and yaw stability inputs, summing means to combine the pilot's yaw control signal to the yaw stability input to produce a net trimmed yaw input signal, summing means to combine the pilot's roll control signal with the roll stability input to produce a net trimmed roll input signal, and summing means to combine the pilot's pitch control signal to the pitch stability input to produce a net trimmed pitch input signal.

30. The invention defined in claim 26 wherein the link and lever means of each of said yaw and roll variable gain mechanisms comprises; a pivoted cam follower lever having follower means contacting its associated programming cam, a first link connected adjacent one end to the output means of said mechanism and connected adjacent its opposite end for movement in an arcuate path together with said cam follower lever, said opposite end of said first link also being connected to one end of a second link, the second link being connected adjacent its opposite end to an end portion of an input lever, said input lever being pivotally connected to a fixed pivot, the latter being positioned such that one point on said arcuate path is aligned with the axis of the fixed pivot, said input lever also being operably connected to the input means for control signals and occupying angular positions determined thereby, whereby angular movement of said input lever in response to a control input to the variable gain mechanism effects movement of the output means of said mechanism except when said opposite end of said first link is in correspondence with said one point on said arcuate path.

31. The invention defined in claim 30 wherein a first one of said input levers is common to the first and second variable gain mechanisms, and a second one of said input levers is common to the third and fourth variable gain mechanisms.

32. The invention defined in claim 31 further including means providing a yaw stability input to said first and second variable gain mechanisms, a summing lever connected to sum said yaw stability input with the pilot's input yaw control signal to yield a net trimmed yaw input signal, said summing lever connected to said first input lever thereby to provide said operable connection to the latter to apply control signals thereto.

33. The invention defined in claim 32 further including means providing a roll stability input to said third and fourth variable gain mechanisms, a further summing lever connected to sum said roll stability input with the pilot's input roll control signal to yield a net trimmed roll input signal, said further summing lever connected to said second input lever thereby to provide said operable connection to the latter to apply control signals thereto.

34. In a VTOL aircraft of the tilt wing type, having a wing mounted on said aircraft and means to increase the angle of tilt of said wing from a substantially horizontal to a substantially vertical position, laterally spaced thrust producers associated with said wing each having thrust varying means responsive to control signals, control surfaces attached to said wing in positions to intercept gas streams induced by said laterally spaced thrust producers and including means to vary the control surface settings in response to control signals, elevators and a rudder associated with said aircraft, and a vertical thrust producer positioned rearwardly on said aircraft and having a thrust varying means associated therewith, pilot's control means for producing pitch, roll and yaw control signals, means connecting the pilot's control means to said rudder and said elevators to transmit yaw and pitch control signals respectively, a control authority transfer unit comprising in combination:
 a. pitch authority transfer means including input means connected to receive pitch control signals from the pilot's pitch control means, and output means connected to the thrust varying means of said rearwardly positioned thrust producer;
 b. yaw authority transfer means including input means connected to receive yaw control signals from the pilot's yaw control means and having output means connected both to said means to vary the thrusts of the laterally spaced thrust producers and to the means to vary the settings of said control surfaces;
 c. roll authority transfer means including input means connected to receive roll control signals from the pilot's roll control means and having output means connected both to the means to vary the thrusts of said laterally spaced thrust producers and to the means to vary the settings of said control surfaces;
 d. a further input means operatively associated with each of said pitch, yaw and roll authority transfer means, said further input means comprising shaft means connected and mounted such that said shaft means is rotated to various angular positions in accordance with the angle of wing tilt;
 e. said pitch authority transfer means being arranged to respond to actuation of the further input means by progressively transferring pitch control authority to said rearwardly positioned thrust producer as the angle of wing tilt increases;
 f. said yaw authority transfer means being arranged to respond to actuation of the further input means by progressively transferring yaw control authority to said control surfaces as the angle of wing tilt increases; and
 g. said roll authority transfer means being arranged to respond to actuation of the further input means by decreasing the roll control authority of said control surfaces while increasing the roll control authority of the laterally spaced thrust producers as the angle of wing tilt increases.

35. The invention as defined in claim 34 wherein said pitch, yaw and roll authority transfer means are serially disposed along said elongated input shaft means.

36. The invention defined in claim 34 wherein each of said pitch, roll, and yaw authority transfer means comprises variable gain mechanisms interconnected between their respective inputs and their output means, each such variable gain mechanism being operatively connected to and responsive to rotation of said input shaft means whereby the gain of each variable gain mechanism is a predetermined function of the angle of wing tilt.

37. The invention defined in claim 36 wherein each said variable gain mechanism comprises; a programming cam connected to said input shaft means for rotation therewith, and link and lever means operatively connected to said programming cam and interconnected between its input and output means and adapted to assume varied configurations in response to rotation of said programming cam to effect said increases and decreases in gain.

38. The invention defined in claim 37 wherein at least the yaw and roll authority transfer means are mounted within a common housing.

39. The invention defined in claim 36 wherein said pitch authority transfer means comprises a fifth variable gain mechanism arranged such that the gain thereof increases from zero to a maximum value as the wing tilt angle increases from zero to a maximum value.

40. The invention defined in claim 37 wherein the link and lever means of each of said yaw and roll variable gain mechanisms comprises; a pivoted cam follower lever having follower means contacting its associated programming cam, a first link connected adjacent one end to the output means of said mechanism and connected adjacent its opposite end for movement in an arcuate path together with said cam follower lever, said opposite end of said first link also being connected to one end of a second link, the second link being connected adjacent its opposite end to an end portion of an input lever, said input lever being pivotally connected to a fixed pivot, the latter being positioned such that one point on said arcuate path is aligned with the axis of the fixed pivot, said input lever also being operably connected to the input means for control signals and occupying angular positions determined thereby, whereby angular movement of said input lever in response to a control input to the variable gain mechanism effects movement of the output means of said mechanism except when said opposite end of said first link is in correspondence with said one point on said arcuate path.

41. The invention defined in claim 40 wherein a first one of said input levers is common to the first and second variable gain mechanisms, and a second one of said input levers is common to the third and fourth variable gain mechanisms.

42. The invention defined in claim 41 further including means providing a yaw stability input to said first and second variable gain mechanisms, a summing lever connected to sum said yaw stability input with the pilot's input yaw control signal to yield a net trimmed yaw input signal, said summing lever connected to said first input lever thereby to provide said operable connection to the latter to apply control signals thereto.

43. The invention defined in claim 42 further including means providing a roll stability input to said third and fourth variable gain mechanisms, a further summing lever connected to sum said roll stability input with the pilot's input roll control signal to yield a net trimmed roll input signal, said further summing lever connected to said second input lever thereby to provide said operable connection to the latter to apply control signals thereto.

44. The invention according to claim 34 further comprising means providing pitch, roll and yaw stability inputs, summing means to combine the pilot's yaw control signal to the yaw stability input to produce a net trimmed yaw input signal, summing means to combine the pilot's roll control signal with the roll stability input to produce a net trimmed roll input signal, and summing means to combine the pilot's pitch control signal to the pitch stability input to produce a net trimmed pitch input signal.

45. The invention defined in claim 34 wherein said yaw authority transfer means is further arranged to increase and thereafter decrease the yaw control authority of the laterally spaced thrust producers as the angle of wing tilt increases.

46. The invention defined in claim 45 wherein said roll authority transfer means is further arranged to increase the roll control authority of said control surfaces from a value greater than zero to a maximum value prior to effecting said decrease of roll control authority therein as the angle of wing tilt increases.

47. The invention defined in claim 46 wherein said yaw authority transfer means comprises a first and a second variable gain mechanism:
  i. the first variable gain mechanism arranged such that its gain first increases and thereafter decreases as the wing tilt angle increases from zero to a maximum; and
  ii. the second variable gain mechanism arranged such that its gain increases to a maximum as wing tilt angle increases.

48. The invention defined in claim 47 wherein:
  said roll authority transfer means comprises a third and a fourth variable gain mechanism;
  i. the third variable gain mechanism arranged such that the gain thereof increases from zero as the wing tilt angle increases from zero, and
  ii. the fourth variable gain mechanism arranged such that its gain first increases from a predetermined value greater than zero to a maximum and then decreases to zero as the wing tilt angle increases from zero to a maximum;
the output means for the yaw and roll authority transfer means comprising first, second, third and fourth outputs respectively connected to said first, second, third and fourth variable gain mechanisms.

49. The invention defined in claim 48 further comprising first summing means for summing together the outputs of the first and the third variable gain mechanisms, and second summing means for summing together the outputs of the second and fourth variable gain mechanisms, the thrust varying means of the laterally spaced thrust producers including means for introducing a differential in the thrust settings thereof; the means varying the control surfaces settings including means introducing a differential in the settings thereof, means connecting the output of the first summing means to the means introducing a differential in the thrust settings, and means connecting the output of the second summing means to the means for introducing a differential in the control surfaces settings.

50. In a VTOL aircraft, having a wing mounted on said aircraft, laterally spaced thrust producers associated with said wing each having thrust varying means responsive to control signals, means to tilt said laterally spaced thrust producers between a substantially horizontal and a substantially vertical position to cause the aircraft to go from normal flight through transitional flight to hovering or vertical flight, an attitude control element capable of applying yaw forces to the aircraft in the transitional, hovering and vertical flight modes, means to vary the settings of said attitude control element in response to control signals fed thereto, elevators and a rudder associated with said aircraft, and a vertical thrust producer positioned rearwardly on said aircraft and having a thrust varying means associated therewith, pilot's control means for producing pitch, roll and yaw control signals, means connecting the pilot's control means to said rudder and said elevators to transmit yaw and pitch control signals respectively, a programming unit comprising in combination:
  a. pitch programming means including input means connected to the pilot's pitch control means, and output means connected to the thrust varying means of said rearwardly positioned thrust producer;
  b. yaw programming means including input means connected to the pilot's yaw control means and having output means connected to said means to vary the thrusts of the laterally spaced thrust producers and to the means to vary the setting of said attitude control element;
  c. roll programming means including input means connected to the pilot's roll control means and having output means connected to the means to vary the thrusts of said laterally spaced thrust producers;
  d. a further input means operatively associated with each of said pitch, yaw and roll programming means, said further input means being connected for actuation in accordance with the angle of tilt of said laterally spaced thrust producers;
  e. said pitch programming means being arranged to respond to actuation of the further input means by increasing the pitch control authority of said rearwardly positioned thrust producer as the angle of tilt increases;
  f. said yaw programming means being arranged to respond to actuation of the further input means by increasing the yaw control authority of said attitude control element as the angle of tilt increases while increasing and thereafter decreasing the yaw control authority of the laterally spaced thrust producers;
  g. said roll programming means being arranged to respond to actuation of the further input means by increasing the roll control authority of the laterally spaced thrust producers as the angle of tilt increases; and h. at least one of said pitch, yaw and roll programming means including a variable gain mechanism comprising; a programming cam connected to said further input means so that it is moved to positions in accordance with the angle of tilt of said wing, and a linkage mechanism associated with said programming cam and connected between the programming means input for pilot's control signals and its associated output with said linkage mechanism arranged such that movement of said programming cam in response to tilting motion of said wing alters the configuration of the linkage mechanism in such a way as to vary in predetermined manner said amounts of pilot's control signals transmitted from the input of such programming means to its output.

51. The invention as defined in claim 50 wherein the input means is elongated and mounted for movement in relation to the angle of tilt, with said pitch, yaw and roll programming means being serially disposed along said elongated input means.

52. The invention defined in claim 50 wherein said elongated input means comprises shaft means mounted for rotation to angular positions determined by the angle of tilt.

53. The invention defined in claim 50 wherein each of said pitch, roll, and yaw programming means includes at least one of said variable gain mechanisms interconnected between its respective inputs and its output means, each said variable gain mechanism having its programming cam connected to said further input means whereby the gain of each variable gain mechanism is a predetermined function of the angle of tilt.

54. The invention defined in claim 51 wherein said yaw programming means comprises a first and a second one of said variable gain mechanisms:
 i. the first variable gain mechanism arranged such that its gain first increases and thereafter decreases as the tilt angle increases from zero to a maximum; and
 ii. the second variable gain mechanism arranged such that its gain increases to a maximum as the tilt angle increases.

55. The invention defined in claim 54 wherein:
said roll programming means includes a third one of said variable gain mechanisms;
 i. the third variable gain mechanism arranged such that the gain thereof increases from zero as the tilt angle increases from zero;
 the output means and the yaw and roll programming means comprising first, second and third outputs respectively connected to said first, second and third variable gain mechanisms.

56. A mixing and programming unit for use with a VTOL aircraft having a plurality of attitude control elements including tiltable laterally spaced thrust producers, said unit being adapted to provide pitch, yaw and roll control outputs for the attitude control elements in response to pilot's pitch, yaw and roll control signal inputs, said unit comprising pitch, roll, and yaw programming assemblies having respective pilot's pitch, roll and yaw control signal input means and also having respective pitch roll and yaw controlling output means associated therewith, and a shaft means rotatably mounted on said unit and adapted to be connected such that the shaft occupies angular positions in accordance with the angle of tilt of the thrust producers, said shaft means being operatively connected to each of the pitch, roll and yaw programming assemblies to provide a further input thereto, each of the pitch, roll, and yaw programming assemblies including a variable gain mechanism connected between its input for pilot's control signals and its output means with each variable gain mechanism being adapted to respond to the further input provided by the shaft means whereby the gain of each variable gain mechanism is a predetermined function of the angular position of said shaft, each variable gain mechanism including a programming cam connected to said input shaft means for rotation therewith, and link and lever means operatively connected to said programming cam and interconnected between its input and output means and adapted to assume varied configurations in response to rotation of said programming cam to effect said increases and decreases in gain.

57. The mixing programming unit according to claim 56 wherein said pitch, roll, and yaw programming assemblies are serially arranged along said shaft means.

58. The mixing and programming unit according to claim 57 wherein the link and lever means of each of said yaw and roll variable gain mechanism comprises; a pivoted cam follower lever having follower means contacting its associated programming cam, a first link connected adjacent one end to the output means of said mechanism and connected adjacent its opposite end for movement in an arcuate path together with said cam follower lever, said opposite end of said first link also being connected to one end of a second link, the second link being connected adjacent its opposite end to an end portion of an input lever, said input lever being pivotally connected to a fixed pivot, the latter being positioned such that one point on said arcuate path is aligned with the axis of the fixed pivot, said input lever also being operably connected to the input means for control signals and occupying angular positions determined thereby, whereby angular movement of said input lever in response to a control input to the variable gain mechanism effects movement of the output means of said mechanism except when said opposite end of said first link is in correspondence with said one point on said arcuate path.

59. The mixing and programming unit according to claim 56 wherein the yaw programming assembly comprises a first and a second variable gain mechanism with the roll programming assembly comprising a third and a fourth variable gain mechanism with the output means for said yaw and roll programming assemblies comprising first, second, third and fourth outputs respectively associated with said first, second, third and fourth variable gain mechanisms, means for summing together the outputs of the first and the third variable gain mechanisms, and further means for summing together the outputs of the second and fourth variable gain mechanisms.

60. The mixing and programming unit according to claim 58 wherein the yaw programming assembly comprises a first and a second variable gain mechanism with the roll programming assembly comprising a third and a fourth variable gain mechanism with the output means for said yaw and roll programming assemblies comprising first, second, third and fourth outputs respectively associated with said first, second, third and fourth variable gain mechanism, means providing pitch, roll and yaw stability inputs, summing means to combine the pilot's yaw control signal to the yaw stability input to produce a net trimmed yaw input signal, summing means to combine the pilot's roll control signal with the roll stability input to produce a net trimmed roll input signal, and summing means to combine the pilot's pitch control signal to the pitch stability input to produce a net trimmed pitch input signal.

61. The mixing programming unit according to claim 59 wherein a first one of said input levers is common to the first and second variable gain mechanisms, and a second one of said input levers is common to the third and fourth variable gain mechanisms.

62. A mixing and programming unit for a VTOL aircraft having tiltable laterally spaced thrust producers adapted to be tilted between a nontilted substantially horizontal position and a tilted position relative to the substantially horizontal position, said unit being adapted to provide pitch, yaw and roll control outputs in response to the pilot's pitch, yaw and roll inputs thereto comprising:
 a. a pitch programming assembly having an input for pilot's pitch control signals and a pitch controlling output means;
 b. a roll programming assembly having an input for pilot's roll control signals and a first and a second roll controlling output means;
 c. a yaw programming assembly having an input for pilot's yaw control signals and a first and a second yaw controlling output means;

d. a further input means operatively connected to each of said pitch, roll, and yaw programming assemblies, said further input means comprising shaft means mounted for rotation to angular positions determined by the angle of tilt of said laterally spaced thrust producers;

e. each of said pitch, roll, and yaw programming assemblies being responsive to said further input means whereby the output of each of said output means is a predetermined function of said angle of tilt;

f. said pitch programming assembly being adapted to produce an output in response to a pilot's pitch control input thereto when the laterally spaced thrust producers are tilted;

g. said yaw programming assembly being adapted to produce in response to a pilot's yaw input signal thereto, when said laterally spaced thrust producers are tilted, one output at said first yaw controlling output means and another output at said second yaw controlling output means; and h. said roll programming assembly being adapted to produce in response to a pilot's roll input signal thereto, when said laterally spaced thrust producers are tilted, one output at said first roll controlling output means and another output at said second roll controlling output means.

63. The invention set forth in claim 62 wherein said pitch, roll, and yaw programming assemblies each include at least one variable gain mechanism, each of the latter having respective programming cams of predetermined configuration adapted to vary the gain of their associated variable gain mechanisms in predetermined fashion in response to changes in wing tilt angle, the programming cams being connected to said shaft means for rotation therewith so that they assume angular positions corresponding to the angular positions of tilt of said wing.